(12) United States Patent
Avgerinos et al.

(10) Patent No.: US 9,619,375 B2
(45) Date of Patent: Apr. 11, 2017

(54) METHODS AND SYSTEMS FOR AUTOMATICALLY TESTING SOFTWARE

(71) Applicant: Carnegie Mellon University, Pittsburgh, PA (US)

(72) Inventors: Thanassis Avgerinos, Pittsburgh, PA (US); Alexandre Rebert, Wettolshei (FR); David Brumley, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 14/718,329

(22) Filed: May 21, 2015

(65) Prior Publication Data
US 2015/0339217 A1 Nov. 26, 2015

Related U.S. Application Data

(60) Provisional application No. 61/997,179, filed on May 23, 2014.

(51) Int. Cl.
*G06F 9/44* (2006.01)
*G06F 11/36* (2006.01)

(52) U.S. Cl.
CPC ...... *G06F 11/3688* (2013.01); *G06F 11/3608* (2013.01)

(58) Field of Classification Search
CPC .. G06F 11/3638; G06F 11/36; G06F 11/3688; G06F 11/3608
See application file for complete search history.

(56) References Cited

U.S. PATENT DOCUMENTS 5,784,553 A * 7/1998 Kolawa ............... G06F 11/3676
714/38.1
8,966,453 B1 * 2/2015 Zamfir ............... G06F 11/3604
714/38.1

(Continued)

OTHER PUBLICATIONS

Patrice Godefroid, "Higher-Order Test Generation", [Online], ACM 2011, pp. 258-269, [Retrieved from Internet on Jun. 2, 2016], <http://delivery.acm.org/10.1145/2000000/1993529/p258-godefroid.pdf>.*

(Continued)

*Primary Examiner* — Thuy Dao
*Assistant Examiner* — Ziaul A Chowdhury
(74) *Attorney, Agent, or Firm* — Schwegman Lundberg & Woessner, P.A.

(57) ABSTRACT

An automatic software testing machine may be configured to provide an advanced symbolic execution approach to software testing that combines dynamic symbolic execution and static symbolic execution, leveraging the strengths of each and avoiding the vulnerabilities of each. One or more software testing machines within a software testing system may be configured to automatically and dynamically alternate between dynamic symbolic execution and static symbolic execution, based on partial control flow graphs of portions of the software code to be tested. In some example embodiments, a software testing machine begins with dynamic symbolic execution, but switches to static symbolic execution opportunistically. In static mode, instead of checking entire programs for verification, the software testing machine may only check one or more program fragments for testing purposes. Thus, the software testing machine may benefit from the strengths of both dynamic and static symbolic execution.

21 Claims, 17 Drawing Sheets

(56) References Cited

U.S. PATENT DOCUMENTS

| | | | | |
|---|---|---|---|---|
| 2006/0253739 | A1* | 11/2006 | Godefroid | G06F 11/3688 714/38.13 |
| 2007/0033576 | A1* | 2/2007 | Tillmann | G06F 11/3688 717/124 |
| 2007/0169057 | A1* | 7/2007 | Silvera | G06F 8/4452 717/160 |
| 2008/0215921 | A1* | 9/2008 | Branca | G06F 11/3688 714/38.14 |
| 2009/0125887 | A1* | 5/2009 | Kahlon | G06F 11/3608 717/126 |
| 2009/0193401 | A1* | 7/2009 | Balakrishnan | G06F 9/44589 717/144 |
| 2009/0265692 | A1* | 10/2009 | Godefroid | G06F 11/3688 717/128 |
| 2010/0005454 | A1* | 1/2010 | Sankaranarayanan | G06F 11/3608 717/127 |
| 2010/0083233 | A1* | 4/2010 | Vanoverberghe | G06F 11/3612 717/126 |
| 2011/0161936 | A1* | 6/2011 | Huang | G06F 11/3688 717/130 |
| 2011/0246970 | A1* | 10/2011 | Ganai | G06F 11/3608 717/132 |
| 2011/0314251 | A1* | 12/2011 | Godefroid | G06F 11/3624 711/217 |
| 2012/0011492 | A1* | 1/2012 | Sinha | G06F 11/3608 717/132 |
| 2012/0017117 | A1* | 1/2012 | Ghosh | G06F 11/3608 714/26 |
| 2012/0084759 | A1* | 4/2012 | Candea | G06F 11/3612 717/126 |
| 2012/0151454 | A1* | 6/2012 | Artzi | H04L 69/40 717/131 |
| 2012/0179935 | A1* | 7/2012 | Wang | G06F 11/3676 714/32 |
| 2012/0317554 | A1* | 12/2012 | Mulat | G06F 11/3608 717/131 |
| 2012/0317647 | A1* | 12/2012 | Brumley | G06F 21/00 726/25 |
| 2013/0055210 | A1* | 2/2013 | Murthy | G06F 11/3608 717/126 |
| 2014/0053134 | A1* | 2/2014 | Wiggers | G06F 11/3608 717/124 |
| 2014/0282432 | A1* | 9/2014 | Yoshida | G06F 11/3608 717/131 |
| 2015/0363305 | A1* | 12/2015 | Guan | G06F 11/3688 717/132 |

OTHER PUBLICATIONS

Nikolaj Bjørner et al., "Path Feasibility Analysis for String-Manipulating Programs", [Online], 2009, pp. 307-321, [Retrieved from Internet on Jun. 14, 2016], <http://www.msr-waypoint.net/pubs/81181/fulltext.pdf>.*

Edward J. Schwartz et al., All You Ever Wanted to Know About Dynamic Taint Analysis and Forward Symbolic Execution, [Online], 2010, pp. 317-331, [Retrieved from Internet on Dec. 15, 2016], <http://ieeexplore.ieee.org/stamp/stamp.jsp?arnumber=5504796>.*

Patrice Godefroid, "Compositional Dynamic Test Generation", [Online], 2007, pp. 47-54, [Retrieved from Internet on Dec. 15, 2016], <http://ieeexplore.ieee.org/stamp/stamp.jsp?arnumber=5504796>.*

Cristian Cadar et al. "Symbolic Execution for Software Testing: Three Decades Later", [Online], 2013, pp. 1-8, [Retrieved from Internt on Dec. 15, 2016], <https://pdfs.semanticscholar.org/1144/3efe465ad544f478524da6c66c085b16e28b.pdf>.*

Nachiappan Nagappan et la., "Static Analysis Tools as Early Indicators of Pre-Release Defect Density", [Online], 2005, pp. 580-586, [Retrieved from Internet on Dec. 15, 2016], <http://delivery.acm.org/10.1145/1070000/1062558/p580-nagappan.pdf>.*

"KLEE: OSDI'08 Coreutils Experiments", [Online]. Retrieved from the Internet: <URL: http://klee.github.io/docs/coreutils-experiments/>, (Accessed on: Jul. 27, 2015), 4 pgs.

"Public Release of all bugs found for Three Linux Diustributions: Fedora, OpenSUSE, and Ubuntu", All web link address copied by original hyperlink, (Jul. 23, 2013), 1 pg.

"Reporting 1.2K crashes", [Online]. Retrieved from the Internet: <URL: CAF1AS2itHonB5KTnqNnX5xat4Bh7ytr0dG2tx-X6BSKzboVSMzA@mail.gmail.com>, (Accessed on: Jul. 20, 2015), 2 pgs.

Aho, Alfred V, et al., "", Compilers: Principles, Techniques, & Tools Second Edition, Addison Wesley, (Sep. 10, 2006), 1038 pgs.

Allen, J. R, et al., "Conversion of Control Dependence to Data Dependence", POPL '83 Proceedings of the 10th ACM SIGACT-SIGPLAN symposium on Principles of programming languages, (1983), 177-189.

Anand, Saswat, "A Bibliography of Papers on Symbolic Execution Technique and its Applications", [Online]. Retrieved from the Internet: <URL: https://sites.google.com/site/symexbib/>, (Accessed on: Jul. 20, 2015), 8 pgs.

Anand, Saswat, et al., "Demand-Driven Compositional Symbolic Execution", TACAS'08 14th international conference on Tools and algorithms for the construction and analysis of systems, (2008), 367-381.

Avgerinos, Thanassis, "Enhancing Symbolic Execution with Veritesting", 36th International Conference on Software Engineering, Hyderabad India, (2014), 12 pgs.

Babic, Domagoj, et al., "Calysto: scalable and precise extended static checking", Proceedings of the 30th international conference on Software engineering, (2008), 211-220.

Babic, Domagoj, "Exploiting Structure for Scalable Software Verication", A Thesis Submitted in Partial Fulfilment of the Requirements for the Degree of Doctor of Philosophy in the Faculty of Graduate Studies (Computer Science), The University of British Columbia (Vancouver), (2008), 172 pgs.

Bardin, Sebastien, et al., "The BINCOA Framework for Binary Code Analysis", Computer Aided Verification Lecture Notes in Computer Science vol. 6806, (2011), 165-170.

Beyer, Dirk, "Configurable Software Verification: Concretizing the Convergence of Model Checking and Program Analysis", Proceedings of the 19th international conference on Computer aided verification, (2007), 504-518.

Boonstoppel, Peter, et al., "RWset: Attacking Path Explosion in Constraint-Based Test Generation", TACAS'08/ETAPS'08 Proceedings of the Theory and practice of software, 14th international conference on Tools and algorithms for the construction and analysis of systems, (2008), 351-366.

Bounimova, Ella, et al., "Billions and Billions of Constraints: Whitebox Fuzz Testing in Production", Proceedings of the International Conference on Software Engineering, (May 18, 2013), 122-131.

Boyer, Robert S, et al., "SELECT—A formal system for testing and debugging programs by symbolic execution", ACM SIGPLAN Notices—International Conference on Reliable Software 10(6), (1975), 234-245.

Bucur, Stefan, et al., "Parallel symbolic execution for automated real-world software testing", EuroSys '11 Proceedings of the sixth conference on Computer systems, (2011), 183-198.

Cadar, Cristian, et al., "EXE: Automatically Generating Inputs of Death", Journal of ACM Transactions on Information and System Security (TISSEC) 12(2), (Dec. 2008), 14 pgs.

Cadar, Cristian, et al., "KLEE: Unassisted and automatic generation of high-coverage tests for complex systems programs", Proc. of the USENIX Symposium on Operating System Design and Implementation, (Dec. 2008), 1-14.

Cadar, Cristian, et al., "Symbolic Execution for Software Testing: Three Decades Later", Communications of the ACM 56(2), (Feb. 2013), 82-90.

Chipounov, Vitaly, et al., "S2E: A Platform for In-Vivo Multi-Path Analysis of Software Systems", Proc. of the International Conference on Architectural Support for Programming Languages and Operating Systems, (2011), 265-278.

(56) References Cited

OTHER PUBLICATIONS

Coling Bourne, Peter, et al., "Symbolic Crosschecking of Floating-Point and SIMD Code", EuroSys '11 Proceedings of the sixth conference on Computer systems, (2011), 315-328.

Dillig, Isil, et al., "Sound, complete and scalable path-sensitive analysis", Proceedings of the 29th ACM SIGPLAN Conference on Programming Language Design and Implementation, (2008), 270-280.

Filliatre, Jean- Christophe, et al., "Type-Safe Modular Hash-Consing", Proceedings of the 2006 workshop on ML, (2006), 12-19.

Flanagan, Cormac, et al., "Avoiding Exponential Explosion: Generating Compact Verification Conditions", POPL '01 Proceedings of the 28th ACM SIGPLAN-SIGACT symposium on Principles of programming languages, (2001), 193-105.

Godefroid, Patrice, et al., "Automated whitebox fuzz testing", Proc. of the Network and Distributed System Security Symposium;, (Feb. 2008), 1-16.

Godefroid, Patrice, "Compositional Dynamic Test Generation (Extended Abstract)", POPL '07 Proceedings of the 34th annual ACM SIGPLAN-SIGACT symposium on Principles of programming languages, (2007), 47-57.

Godefroid, Patrice, et al., "DART: Directed Automated Random Testing", Proceedings of the 2005 ACM SIGPLAN conference on Programming language design and implementation 40(6), (Jul. 2005), 213-223.

Godefroid, Patrice, et al., "SAGE: Whitebox Fuzzing for Security Testing", Communications of the ACM 55(3), (2012), 40-44.

Goto, Eiichi, Monocopy and Associative Algorithms in an Extended LISP, University of Tokyo, (1974), 33 pgs.

Hansen, Trevor, "State Joining and Splitting for the Symbolic Execution of Binaries", Lecture Notes in Computer Science vol. 5779, (2009), 76-92.

Hong, Zhu, et al., "Software Unit Test Coverage and Adequacy", ACM computing surveys (csur) 29.4, (Dec 1997), 366-427.

Howden, William E, "Methodology for the Generation of Program Test Data", IEEE Transactions on Computers C-24(5), (1975), 554-560.

Jager, Ivan, et al., "BAP: A binary analysis platform", Proc. of the Conference on Computer Aided Verification, (2011), 7 pgs.

Kil Cha, Sang, et al., "Unleashing MAYHEM on Binary Code", Proceedings of the IEEE Symposium on Security and Privacy, (2012), 380-394.

Kinder, Johannes, et al., "Jakstab: A Static Analysis Platform for Binaries (tool paper)", Proceedings of the 20th international conference on Computer Aided Verification, (Jul. 7, 2008), 423-427.

King, James, "Symbolic execution and program testing", Communications of the ACM, 19, (1976), 386-394.

Korlbl, Alfred, et al., "Constructing Efficient Formal Models from High-Level Descriptions Using Symbolic Simulation", International Journal of Parallel Programming 33(6), (2005), 645-666.

Kuznetsov, Volodymyr, et al., "Efficient State Merging in Symbolic Execution", Proceedings of the 33rd ACM SIGPLAN Conference on Programming Language Design and Implementation, (Nov. 6, 2012), 193-204.

Lattner, Chris, et al., "LLVM: A Compilation Framework for Lifelong Program Analysis & Transformation", CGO '04 Proceedings of the international symposium on Code generation and optimization: feedback-directed and runtime optimization, (2004), 12 pgs.

Luk, C.-K., et al., "Pin: Building Customized Program Analysis Tools with Dynamic Instrumentation", Proceedings of the 2005 ACM SIGPLAN Conference on Programming Language Design and Implementation (PLDI '05), ACM SIGPLAN Notices, 40(6), (2005), 1-11.

Marinescu, Paul Dan, et al., "make test-zesti: A Symbolic Execution Solution for Improving Regression Testing", ICSE '12 Proceedings of the 34th International Conference on Software Engineering, (2012), 716-726.

Molnar, David, et al., "Dynamic Test Generation to Find Integer Bugs in x86 Binary Linux Programs", Proceedings of the 18th conference on USENIX security symposium, (2009), 67-82.

Moura, Lenardo De, et al., "Z3: An Efficient SMT Solver", Tools and Algorithms for the Construction and Analysis of Systems Lecture Notes in Computer Science vol. 4963, (2008), 337-340.

Pasareanu, Corina S, et al., "A survey of new trends in symbolic execution for software testing and analysis", International Journal on Software Tools for Technology Transfer (STTT)—Special Section on HVC 07 11(4), (2009), 339-353.

Rustan, K., et al., "Efficient weakest preconditions", Journal of Information Processing Letters 93(6), (Jul. 31, 2005), 281-288.

Schwartz, Edward J., et al., "All you ever wanted to know about dynamic taint analysis and forward symbolic execution (but might have been afraid to ask)", Proc. of the IEEE Symposium on Security and Privacy, (May 2010), 317-331.

Sen, Koushik, et al., "CUTE: A Concolic Unit Testing Engine for C", Proceedings of the 10th European software engineering conference held jointly with 13th ACM SIGSOFT international symposium on Foundations of software engineering, (2005), 263-272.

Tu, Peng, et al., "Efficient Building and Placing of Gating Functions", PLDI '95 Proceedings of the ACM SIGPLAN 1995 conference on Programming language design and implementation, (1995), 47-55.

Xie, Yichen, et al., "Scalable Error Detection using Boolean Satisfiability", Proceedings of the 32nd ACM SIGPLAN-SIGACT symposium on Principles of programming languages 40(1), (2005), 351-363.

\* cited by examiner

VERITESTING ON A PROGRAM FRAGMENT WITH LOOPS AND SYSTEM CALLS. (A) PARTIALLY RECOVERED CFG. (B) CFG AFTER LOOP UNROLLING & TRANSITION POINT IDENTIFICATION. UNREACHABLE NODES ARE EMPHASIZED

SYMBOLIC STORE TRANSFORMATIONS DURING SSE

SYSTEM ARCHITECTURE

1 X = S (S IS SYMBOLIC)
2 X = X + X
3 X = X + X
4 X = X + X
5 ASSERT (X == 42)

HASH CONSING EXAMPLE. TOP-LEFT: A NAÏVELY GENERATED FORMULA. TOP-RIGHT: A HASH-CONSED FORMULA.

CODE COVERAGE DIFFERENCE ON BIN BEFORE AND AFTER VERITESTING, WHERE VERITESTING MADE A DIFFERENCE

CODE COVERAGE WITH TIME ON BIN BEFORE AND AFTER VERITESTING

CODE COVERAGE DIFFERENCE ON COREUTILS OBTAINED BY THE SYSTEM VS. S2E

METHODS AND SYSTEMS FOR AUTOMATICALLY TESTING SOFTWARE

RELATED APPLICATION

This application claims the priority benefit of U.S. Provisional Patent Application No. 61/997,179, filed May 23, 2014, which is incorporated herein by reference in its entirety.

STATEMENT REGARDING FEDERALLY SPONSORED RESEARCH AND DEVELOPMENT

This invention was made with partial government support under grant CNS0953751 awarded by the National Science Foundation (NSF) and grant DARPA11AP00262 awarded by the Defense Advanced Research Projects Agency (DARPA). The government has certain rights in this invention.

TECHNICAL FIELD

The subject matter disclosed herein generally relates to machines that are configured to test software code. Specifically, the present disclosure addresses systems and methods that use symbolic execution for automated testing of software code.

BACKGROUND

Symbolic execution is a popular, automatic approach for testing software, generating test cases, and finding bugs. Symbolic execution was discovered in 1975, with the volume of academic research and commercial systems exploding in the last decade. The online bibliography at http://sites.google.com/site/symexbib lists over 150 papers on symbolic execution techniques and applications, and published surveys exist. Notable examples include "SAGE" and "KLEE." SAGE was responsible for finding one third of all bugs discovered by file fuzzing during the development of Windows 7. KLEE was the first tool to show that symbolic execution can generate test cases that achieve high coverage on real programs by demonstrating it on the UNIX utilities. There is a multitude of symbolic execution systems. For more details, various surveys may be consulted.

Over the past decade, numerous symbolic execution tools have appeared—both in academia and industry—showing the effectiveness of the technique in finding crashing inputs, generating test cases with high coverage, exposing software vulnerabilities, and generating exploits.

Symbolic execution can be attractive, because it systematically explores the software code (e.g., program) and produces real inputs. Symbolic execution operates by automatically translating a software code fragment (e.g., a program fragment) into a formula (e.g., a symbolic expression) in logic. The logical formula is then solved to determine inputs that have a desired property (e.g., executing the desired execution paths or violating safety). Such inputs satisfy the formula with respect to that desired property.

There are two main approaches for generating formulas. First, dynamic symbolic exploration (DSE) explores software code (e.g., programs) and generates formulas on a per-path basis. Second, static symbolic execution (SSE) translates executable statements (not execution paths) into formulas, where the formulas represent the desired property over any path within the selected statements.

Merging execution paths was pioneered by Koelbl et al. in SSE. Concurrently and independently, Xie et al. developed Saturn, a verification tool capable of encoding multiple paths before converting the problem to a Boolean Satisfiability Problem (SAT). Hansen et al. followed an approach similar to Koelbl et al. at the binary level. Babic improved the static algorithm of Hansen et al. to produce smaller and faster approaches to solve formulas by leveraging Gated Single Assignment (GSA) and maximally-shared graphs (similar to hash-consing).

The efficiency of above static algorithms typically stems from various types of if-conversion, a technique for converting code with branches into predicated straightline statements. The technique is also known as φ-folding, a compiler optimization technique that collapses simple diamond-shaped structures in the control flow graph (CFG). Collingbourne et al. used φ-folding to verify semantic equivalence of single instruction, multiple data (SIMD) instructions.

Boonstoppel et al. proposed RWSet, a state pruning technique identifying redundant states based on similarity of their live variables. If live variables of a state are equivalent to a previously explored path, RWSet will stop exploring the states, as it will not offer additional coverage.

Godefroid et al. introduced function summaries to test code compositionally. The main idea is to record the output of an analyzed function, and to reuse it if it is called again with similar arguments. This work was later expanded to generate such summaries on demand [40].

BRIEF DESCRIPTION OF THE DRAWINGS

Some embodiments are illustrated by way of example and not limitation in the figures of the accompanying drawings.

DETAILED DESCRIPTION

Figure 1:
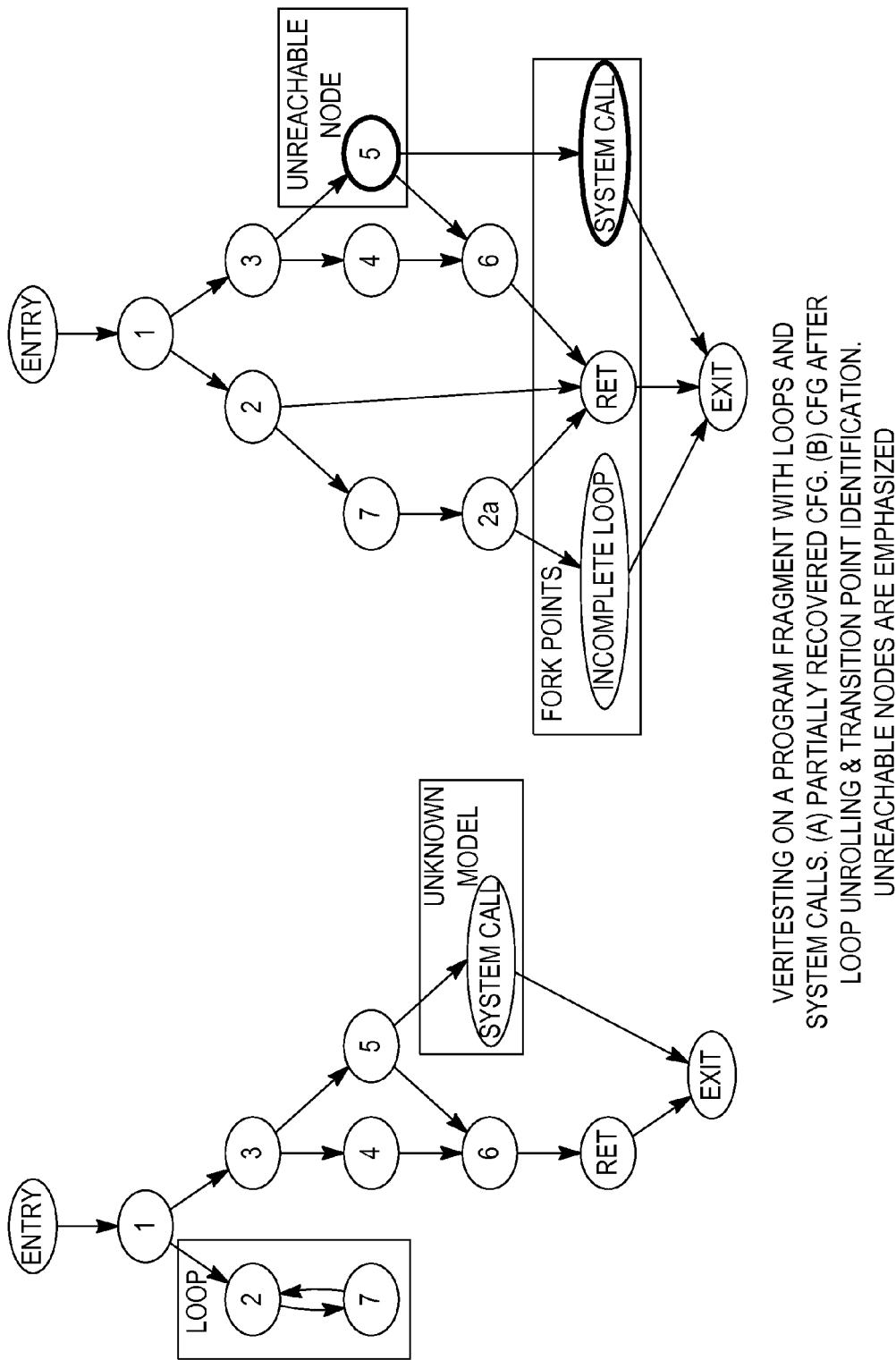
FIG. 1 is a conceptual diagram of a CFG for a program fragment with loops and system calls, according to some example embodiments.

Example methods and systems discussed herein are directed to automatic testing of software code. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A limitation of prior approaches to generating formulas for symbolic execution of software code is that they do not provide a technique for using verification-based SSE to improve, supplement, complement DSE for testing (e.g., for test case generation, for finding software bugs, or for any suitable combination thereof). Further, prior approaches are prone to path explosion in DSE and vulnerable to solver blowup in SSE.

Therefore it may be beneficial to provide a more advanced symbolic execution approach to software testing that combines DSE and SSE, leveraging the strengths of each and avoiding the vulnerabilities of each. Accordingly, one or more machines (e.g., one or more software testing machines within a software testing system) may be configured to automatically and dynamically alternate (e.g., switch) between DSE and SSE, according to various example embodiments of algorithms discussed herein. The static portion of the algorithms discussed herein may implement one or more prior approaches (e.g., among other approaches). Configured according to any of the example embodiments described herein, one or more machines of a software testing system is configured to alternate between SSE and DSE. Thus, example embodiments of the systems and methods discussed herein amplify the effect of DSE and leverages the strengths of both DSE and SSE.

Described herein are example embodiments of methods and systems for automatically testing (e.g., checking) software code (e.g., programs) using symbolic execution (e.g., a symbolic executor or other machine configured to perform software testing via symbolic execution). At a high level, symbolic execution can be partitioned into two general approaches: DSE for testing, and SSE for verification. DSE works by generating per-path formulas to test specific paths, while SSE generates formulas over entire programs with the goal of verifying overall safety. According to example embodiments of the methods and systems described herein, a software testing machine may be configured to combine both approaches by carefully alternating between DSE and SSE to harness the benefits of both approaches, while mitigating path explosion in dynamic approaches (e.g., DSE) and solver blowup in static approaches (e.g., SSE). In particular, the software testing machine may start with DSE, but alternate (e.g., switch) to SSE opportunistically (e.g., in response to detection of certain conditions or characteristics of a portion of the software code being tested). After such a switch, the software testing machine performs SSE on program fragments (e.g., for testing purposes), instead of performing SSE on entire programs (e.g., for verification purposes).

For brevity, the term "veritesting" is used herein to refer to software testing methods that alternate between DSE and SSE (e.g., dynamically, opportunistically, or both). Accordingly, the methods and systems discussed herein implement a veritesting approach to software code testing.

As noted above, there are two main approaches for generating formulas. First, DSE explores programs and generates formulas on a per-path basis. Second, SSE translates statements (not paths) into formulas, where the formulas represent the desired property over any path within the selected statements.

The path-based nature of DSE typically involves significant overhead when generating formulas, but the formulas themselves are easy to solve. In contrast, the statement-based nature of SSE typically produces more succinct formulas with less overhead that cover more paths, but the formulas are harder to solve. The methods and systems described herein alternate between SSE and DSE (e.g., dynamically and opportunistically). The alternation tames the difficulty of solving formulas, while mitigating the high overhead associated with a path-based DSE approach. In addition, DSE systems replicate the per-path nature of concrete execution, allowing them to handle cases such as system calls and indirect jumps where static approaches would rely on summaries or additional analysis. Alternating between DSE and SSE allows the methods and systems described herein to switch to DSE-based methods to handle such tricky cases when they occur.

As a prelude to providing further description of the methods and systems discussed herein, it may be helpful to convey an overview of a software testing system and, more particularly, the metrics that may be used in software testing. Also an overview of DSE and SSE is presently provided.

Regarding testing metrics, software testing systems (e.g., software testing machines that implement DSE) are typically evaluated using three metrics: 1) node coverage, 2) path coverage, and 3) the number of unique bugs (e.g., unique real bugs) found.

As used herein, a "node" refers to a piece of software code (e.g., a line or a statement within a program). Node coverage (e.g., code coverage, line coverage, or statement coverage) measures the percentage of software code covered by generated test cases with respect to the entire software application. Node coverage is an effective way of measuring the performance of a test case generation system [49] and has been used repeatedly to measure the performance of symbolic execution systems [16, 35].

As used herein, a "path" refers to an execution path within software code. Path coverage measures the percentage of execution paths (e.g., program paths) analyzed over the total number of execution paths (e.g., the number of possible execution paths within the software code). Unlike node coverage, which has a finite domain (e.g., the total number of program statements), many programs have an infinite number of paths (e.g., a server program) and measuring the path coverage is not possible in such situations. Path coverage may be approximated by three distinct additional metrics: time to complete exploration, multiplicity, and fork rate. These additional metrics are described later in this document.

The number of unique bugs found is measured by counting the number of unique stack hashes [42] among crashes.

The methods and systems described herein, according to various example embodiments, may report bugs only when a generated test case produces a core file during concrete execution of the corresponding path.

In many situations, all three of these metrics are important, and none dominates in all scenarios. For example, node coverage is useful, but even 100% node coverage may fail to find certain real bugs. As another example, it may be possible to achieve 100% node coverage but never execute a loop more than once. Hence, bugs that are triggered only after several iterations (e.g., buffer overflows) would be missed. Testing more paths is generally better, but an analysis could cheat (e.g., game) the metric by simply iterating easy-to-execute loops more times and omitting harder-to-execute loops. Again, certain bugs may be missed and certain nodes may not be covered. Moreover, a software testing machine could find all bugs (e.g., all unique bugs), but be unable to determine that this has occurred because not all paths have been exhausted.

Algorithm 1 below includes the core steps in DSE, among other operations. In some example embodiments, Algorithm 1 operates on a representative imperative language with assignments, assertions and conditional jumps (e.g., adapted from other work [35]). A symbolic executor maintains a state $(l, \Pi, \Delta)$ where $l$ is the address of the current instruction, $\Pi$ is the path predicate, and $\Delta$ is a symbolic store that maps each variable to either a concrete value or an expression over input variables. A satisfying assignment, typically checked by an SAT solver or a Satisfiability Modulo Theories (SMT) solver, is an assignment of values to symbolic input variables that will execute the same execution path. An unsatisfiable path predicate means the selected path is infeasible.

Algorithm 1: DSE Algorithm with and without Veritesting

```
Input: Initial location l₀, instruction decoder instrAt
Data: Worklist W, path predicate Π, symbolic store Δ
1   W ← {(l₀, true, ∅)}                    // initial worklist
2   while W ≠ ∅ do
3   ⌐  ((l, Π, Δ), W) ← pickNext(W)
       // symbolically execute the next instruction
4   |  switch instrAt(l) do
5   |  ⌐  case v := e                       // assignment
6   |  |  ⌐  S ← {(succ(l), Π, Δ [v → eval(Δ, e)])}
7   |  |  case if (e) goto l'               // conditional jump
8   |  |  ⌐  e ← eval(Δ, e)
9   |  |  |  if (isSat(Π∧e)∧isSat(Π∧¬e)) then
10  |  |  |  ⌐  // DSE forks 2 states
11  |  |  |  |  S ← {(l', Π∧e, Δ), (succ(l), Π∧¬e, Δ)}
10  |  |  |  |  // Veritesting integration
11  |  |  |  |  S ← ∅
12  |  |  |  |  CFG ← CFGRecovery(l, Π)
13  |  |  |  |  CFGₑ, ForkPoints ← CFGReduce (CFG)
14  |  |  |  |  OUT ← StaticSymbolic(CFGₑ, Π, Δ)
15  |  |  |  |  for Point ∈ ForkPoints do
16  |  |  |  |  ⌐  if OUT[Point] ≠ ∅ then
17  |  |  |  |  |  ⌐  S ← OUT[Point] ∪ S
18  |  |  |  |  ⌊  S ← Finalize(S)
19  |  |  |  else if isSat(Π∧e) then
20  |  |  |  ⌐  S ← {(l', Π∧e, Δ)}
21  |  |  ⌊  else S ← {( succ(l), Π∧¬e, Δ)}
22  |  |  case assert(e)                    // assertion
23  |  |  ⌐  e ← eval(Δ, e)
24  |  |  |  if isSat(Π∧¬e) then reportBug(Π∧¬e)
25  |  |  ⌊  S ← {(succ(l), Π∧e, Δ)}
26  |  ⌊  case halt: continue;              // end of path
27  ⌊  W ← W ∪ S
```

On line 1 of Algorithm 1, the worklist W is initialized with a state pointing to the start of the program. The pickNext function selects the next state to continue executing, and removes it from the worklist S. There are a variety of search heuristics for selecting the next instruction to execute, including starting with a concrete trace [26,46], generational search [28], Depth-First Search (DFS), and Breadth-First Search (BFS). Symbolic execution switches over the instruction types in line 4 of Algorithm 1. Safety checks are performed with assertions. For example, every memory dereference may be preceded by an assertion that checks whether the pointer is in bounds. The semantics of assignment, assert, and halt may be straightforward. Line 7 of Algorithm 1 provides a way to handle a branch instruction, according to various example embodiments of the methods and systems described herein.

The two instances of line 11 illustrate features of the methods and systems described herein. These features may be absent in alternative implementations. In DSE, whenever both branches are feasible, two new states are added to the worklist: one for the true branch and one for the false branch. This process may be referred to as "forking." Each one of the forked executors may be later chosen from the worklist and explored independently.

Forking executors and analyzing a single path at a time may provide certain benefits. The analysis code may be simple. Solving the generated path predicates is typically fast (e.g., in SAGE [10], 99% of all queries take less than 1 second) since reasoning only occurs about a single path. Furthermore, the concrete path-specific state resolves several practical problems. For example, executors can execute hard-to-model functionality concretely (e.g., system calls); side effects (e.g., allocating memory in each DSE path) may be reasoned about independently without extra work; and loops are unrolled as the code executes. On the other hand, the path explosion problem (or state explosion problem) may be encountered, since the number of executors can grow exponentially with the number of branches. Depending on the context, the terms "path" and "state" may be used interchangeably [14, 35]—an "execution state" typically corresponds to an execution path to be explored. To avoid the path explosion problem, among other reasons, one or more example embodiments of the methods and systems described herein may be utilized, as described below.

SSE is typically a verification technique for representing a program as a logical formula. Potential vulnerabilities are encoded as logical assertions that will falsify the formula if safety is violated. Calysto [11] and Saturn [12, 13] are example SSE tools. Because SSE typically checks entire programs, not individual paths, it is typically employed to verify the absence of bugs. According to example embodiments of the methods and systems described herein, veritesting repurposes SSE techniques for testing program fragments instead of verifying complete programs.

As illustrated by line 11 of Algorithm 1, an SSE algorithm may summarize the effects of both branches at path confluence points. In contrast, DSE typically forks off two executors at the same line, which remain subsequently (e.g., forever afterward) independent. Examples of complete SSE algorithms can be seen in alternative implementations [14, 12, 11]. An SSE algorithm implemented by various example embodiments of the methods and systems described herein may utilize a dataflow framework, as described below.

Unlike DSE, SSE is not vulnerable to the path explosion problem. All paths are encoded in a single formula that is then passed to the solver, though the solver may still internally have to reason about an exponential number of paths. For acyclic programs, existing SSE techniques allow generating compact formulas of size O ($n^2$) [45, 47]—where n is the number of program statements. Despite these benefits over DSE, purely SSE-based approaches may have trouble scaling to very large programs [15, 16, 8]. Potentially problematic situations may include the presence of loops (e.g., how many times should they be unrolled?), formula complexity (e.g., are the formulas solvable if we encode loops and recursion? [13]), the absence of a concrete state (e.g., what is the concrete environment the program is running on?), and unmodeled behavior (e.g., in situations where no kernel model is present to emulate system calls). Another potential hurdle is completeness; for the verifier to prove absence of bugs, all program paths should be checked.

As mentioned above, DSE and SSE may be combined (e.g., alternated dynamically and opportunistically). DSE is effective in analyzing real world programs [3, 17]. However, the path explosion problem can severely reduce the effectiveness of DSE. For example, consider the following 7-line program that counts the occurrences of the character "B" in an input string:

| 1 | int counter = 0, values = 0; |
|---|---|
| 2 | for (i = 0; i < 100; i ++) { |
| 3 | if (input[i] == 'B') { |
| 4 | counter ++ |
| 5 | values += 2 |
| 6 | }} |
| 7 | if (counter == 75) bug( ); |

The program above has $2^{100}$ possible execution paths. In DSE, each path is analyzed separately, thus making full path coverage unattainable for practical purposes. In contrast, just two test cases would suffice for obtaining full code coverage: a string of 75 "B" characters and a string with no "B" characters. However, finding such test cases in the $2^{100}$ path state space may be challenging. For example, $\binom{100}{75} \approx 2^{78}$ paths reach the buggy line of code. The probability of a random path selection strategy finding one of those paths is approximately $$\frac{2^{78}}{2^{100}} = 2^{-22}.$$

The above program has been run with several state-of-the-art symbolic executors, including KLEE [3], S2E [28], Mayhem [5] and Cloud9 with state merging [8]. None of these symbolic executors was able to find the bug within a 1-hour time limit; they either ran out of memory or executed longer than the time limit. However, an example embodiment of the methods and systems described herein enabled a prototype software testing machine to find the bug and obtain full path coverage in 47 seconds on the same computer hardware on which the other symbolic executors were run.

Some example embodiments of the methods and systems described herein start with DSE, but switch to SSE in response to encountering software code (e.g., the above program) that does not contain system calls, indirect jumps, non-statically interpretable executable statements (e.g., statements that are difficult to precisely reason about statically), or any suitable combination thereof. As used herein, the phrase "non-statically interpretable executable statements" refers to any executable instructions that cannot be resolved statically (e.g., indirect or otherwise unresolved jumps) by a symbolic executor or cannot be converted by the symbolic executor to executable statements with known effects (e.g., system calls, complex instructions, or any suitable combination thereof). Once in SSE mode, the example embodiments analyze a dynamically recovered CFG and identify a core of statements that are easy for SSE to analyze, as well as a frontier of statements that are difficult for SSE to analyze. The SSE algorithm summarizes the effects of all paths through the easy statements (e.g., nodes) up to the hard frontier. Accordingly, some example embodiments of the methods and systems described herein then switch back to DSE to handle the statically difficult cases appropriately and may thereafter alternate between DSE and SSE in response to similar criteria. In alternative example embodiments, SSE is performed first (e.g., initially), and the methods and systems switch to DSE and alternate between DSE and SSE thereafter.

Conceptually, veritesting (e.g., via the methods and systems described herein) differs from dynamic state merging (DSM) by Kuznetsov et al. [8]. DSM maintains a history queue of DSE executors. Two DSEs may merge (e.g., depending on a separate and independent SMT query difficulty heuristic) if they coincide in the history queue. Fundamentally, however, DSM is still performing per-path execution, and only opportunistically merging. In contrast, methods and systems that implement veritesting are always merging using SSE (not DSE) on all statements within a fixed lookahead. Consequently, the formulas that result from veritesting cover more paths (e.g., at the expense of a longer SMT query) than formulas that result from DSM, but avoid the overhead of more explicit per-path DSE as found in DSM. Accordingly, the software testing machine configured to perform veritesting is improved compared to a software testing machine configured to perform DSM.

In default mode, the example embodiments of the methods and systems described herein may behave as a dynamic concolic executor [9] and perform DSE on software code being tested. For example, a software testing machine configured to perform veritesting, in accordance with various example embodiments, starts exploration of the software code with a concrete seed and explores paths in the neighborhood of the original seed by following a generational search strategy [17]. In the default mode, the software testing machine does not always fork when it encounters a symbolic branch. Instead, the DSE forking process may be intercepted (e.g., as shown in line 11 of Algorithm 1), and the software testing machine may begin performance of the dynamic combination approach discussed above. As noted above, this dynamic combination approach is referred to herein for brevity as veritesting.

Algorithm 1 is an example embodiment of veritesting. Algorithm 1 augments DSE with four additional operations (e.g., steps):
1. CFGRecovery: recovers the CFG that is reachable from the address of the symbolic branch.
2. CFGReduce: takes in a CFG as input and outputs one or more candidate transition points (e.g., four points) and an acyclic $CFG_e$ with edges annotated with the control flow conditions.
3. StaticSymbolic: takes the acyclic $CFG_e$ and current execution state as inputs and uses SSE to build formulas that encompass all feasible paths in the $CFG_e$. The output is a mapping from $CFG_e$ nodes to SSE states.
4. Finalize: given a list of transition points (e.g., four points) and SSE states, returns the DSE executors to be forked.

Regarding CFGRecovery, the goal of the CFG recovery phase is to obtain a partial CFG of the software code (e.g., the program) to be tested, where the entry point is the current symbolic branch. To simplify discussion, it may be useful to first define "underapproximation" and "overapproximation" of a recovered CFG. The recovered CFG is an "underapproximation" if all edges of the CFG represent feasible paths The recovered CFG is an "overapproximation" if all feasible paths in the CFG are represented by edges.

Statically recovering a perfect (e.g., no approximation) CFG on binary software code may be a difficult problem and may be a subject of active research [18, 19]. In practice, a recovered CFG might be underapproximate, overapproximate, or even both. Veritesting is designed to handle both underapproximate and overapproximate CFGs without losing execution paths or precision. According to certain example embodiments, the methods and systems discussed herein may use the CFG recovery mechanism from a binary analysis platform (BAP) [20]. Furthermore, various example embodiments of the methods and systems discussed herein may be customized to stop recovery at function boundaries, system calls, unknown instructions, or any suitable combination thereof.

The output of this operation is a partial (e.g., possibly approximate) intra-procedural CFG. Targets of unresolved jumps (e.g., ret, call, or other indirect jumps) are forwarded to a generic Exit node in the CFG. FIG. 1 depicts a CFG for a program fragment with loops and system calls, according to some example embodiments. The left side of FIG. 1 shows the form of an example CFG after the recovery phase.

Once the CFG is obtained, various example embodiments of the methods and systems discussed herein proceed to the next operation (e.g., step): identifying transition points (e.g., identifying fork points). The transition points define the boundaries of one or more SSE phases of the automated software test (e.g., where DSE will continue exploration of the software code). To calculate, generate, or otherwise determine these transition points, it may be helpful to define "postdominators" and immediate "postdominators." As used herein:

Definition 1. Postdominator. A node d postdominates a node n, denoted as pdom(d, n), iff every path from n to the exit of the graph goes through d.

Definition 2. Immediate Postdominator. A node d immediately postdominates node n, denoted as ipdom(d, n), iff: pdom(d, n) $\wedge \neg \exists z \neq d$: pdom(d, z)$\wedge$ pdom(z, n).

In the identification of transition points, for an entry node e with a symbolic branch, a transition point is defined as a node n such that ipdom(e, n). For a fully recovered CFG, a single transition point may be sufficient (e.g., the bottom node in the left side of FIG. 1). However, for CFGs with any unresolved jumps or system calls, any predecessor of the Exit node will be a possible transition point (e.g., the ret node in the left side of FIG. 1). The transition points represent the frontier of the visible CFG, which stops at unresolved jumps, function boundaries, system calls, or any suitable combination thereof. The number of transition points may thus provide an upper-bound of the number of states that may be forked.

Certain example embodiments of the methods and systems discussed herein feature loop unrolling, which typically presents a challenge for SSE software testing systems (e.g., static verification tools). However, these example embodiments of the methods and systems discussed herein are dynamic and can concretely execute the CFG to identify how many times each loop will execute. The number of iterations is then used for loop unrolling (e.g., setting a number of iterations that a loop is to be executed). In some example embodiments, the number of iterations is determined by accessing a user input (e.g., a dialog box within a user interface, a user profile, or any suitable combination thereof). Accordingly, a user may specify a maximum number of loop iterations (e.g., regardless of the actual number determined by concrete execution). This also allows the user to extend loops beyond concrete execution, by providing a minimum number of unrolls.

To make the CFG acyclic, back edges are removed and forwarded to a newly created node for each loop (e.g., the "Incomplete Loop" node in the right side of FIG. 1). This loop may be a new transition point that will be explored if executing the loop more times is feasible. In a final pass, the edges of the CFG are annotated with the conditions required to follow the edge (e.g., $CFG_e$).

The result of this operation is an acyclic $CFG_e$ and a set of transition points (e.g., fork points). The right side of FIG. 1 shows an example CFG, without edge conditions, after transition point identification and loop unrolling.

Figure 2:
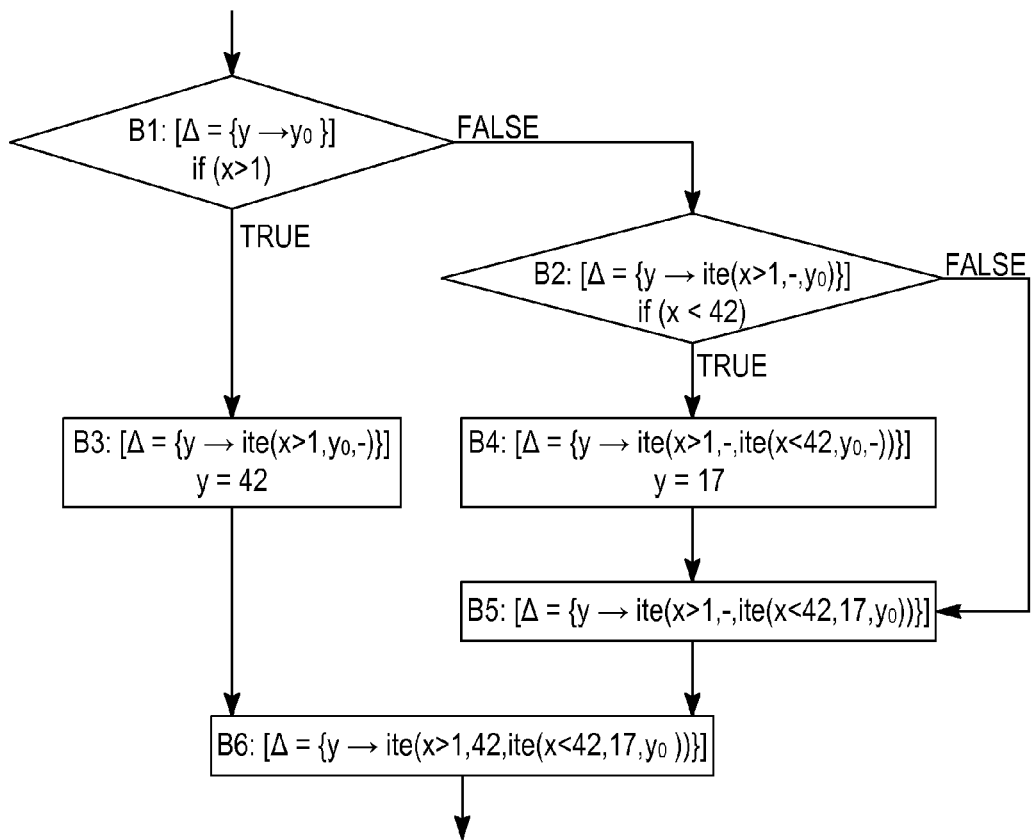
FIG. 2 is a flowchart illustrating symbolic store transformations during SSE, according to some example embodiments.

Given the acyclic $CFG_e$, various example embodiments of the methods and systems discussed herein apply SSE to summarize the execution of multiple execution paths. Previous work [24] first converted a program being tested to Gated Single Assignment (GSA) [42] and then performed symbolic execution. However, various example embodiments of the methods and systems discussed herein encode SSE as a single pass dataflow analysis, in contrast to GSA which is computed on the fly. Table 1 below presents an example embodiment of an SSE algorithm, following standard notation [44, Section 9]. For purposes of illustration, the SSE algorithm can be run on the following software code (e.g., program):

if $(x>1)$ $y=1$; else if $(x<42)$ $y=17$;

FIG. 2 shows the progress of a symbolic store as the SSE algorithm iterates through the basic blocks of the software code, which are labeled B1, B2, B3, B4, B5, and B6. The SSE algorithm starts from the entry of the $CFG_e$ and executes the basic blocks in topological order. The basic blocks contain straightline code and execution follows Algorithm 2 (below), taking in as input (e.g., from IN[B]) a path context $\Gamma$ and a symbolic store $\Delta$ and outputting the updated versions (e.g., for OUT[B]). $\Gamma$ enables multi-path SSE by encoding the conditionals to follow an execution path using if-then-else ("ite") statements. For example, following the true branch after the condition $(x>1)$ in FIG. 2 gives: $\Gamma$=ite(x>1, $\Lambda$, -), where $\Lambda$ denotes the taken path and "-" denotes the non-taken path.

TABLE 1

SSE as a dataflow algorithm (using standard notation [44, Section 9]). IN[B] and OUT[B] denote the input and output sets of basic block B.

| | |
|---|---|
| Domain | Symbolic execution state ($\Gamma$, $\Delta$) |
| Direction | Forwards |
| Transfer Function | Algorithm 2 (below) |
| Boundary | Initial execution state ($\Lambda$, $\Delta_{init}$) |
| Initialize | OUT[B] = 0 |
| Dataflow Equations | IN[B] = $\Lambda_{P, pred(B)}$ OUT[P] |
| | OUT[B] = $f_B$(IN[B]) |
| Meet Function | Algorithm 3 (below) |

Algorithm 2: Veritesting Transfer Function

Input: basic block B, path context $\Gamma$, symbolic store $\Delta$
1  foreach inst $\in$ B do
2  | switch inst do -continued Algorithm 2: Veritesting Transfer Function

```
3  |   |   case v := e
4  |   |   ⌊    Δ ← Δ[v → eval(Δ, e)]

5  |   |   case assert(e)
6  ⌊   ⌊   ⌊    Γ ← Γ[Λ → ite(eval(Δ, e), Λ, -)]

7  return Γ, Δ
```

Algorithm 3: Veritesting Meet Function

```
   Input: basic block B, pred. blocks B₁, B₂, store Π_DSE
1  function Context(B, Parent) begin
2  |    Γ, Δ ← OUT (Parent); taken, e ← edge(Parent, B);
3  |    e ← eval(Δ, e); Π ← Π_DSE ∧ Γ[Λ → true, - → false];
4  |    if taken ∧ isSat(Π ∧ e) then
5  |    ⌊    return Γ[Λ → ite(e, Λ, -)], Δ

6  |    else if ¬taken ∧ isSat(Π ∧ ¬ e) then
7  |    ⌊    return Γ[Λ → ite(e, -, Λ)], Δ

8  ⌊    else return -, 0; // infeasible edge
9  Γ₁, Δ₁ ← Context(B, B₁); Γ₂, Δ₂ ← Context(B, B₂);
10 Γ ← M(Γ₁, Γ₂); Δ ← Δ₁
11 foreach v ∈ Δ₂ do
12 ⌊    Δ[v] = M(Γ₁[Λ → Δ₁[v]], Γ₂[Λ → Δ₂[v]])

13 return Γ, Δ
```

To compute the input set (IN[B]) for a basic block, a meet operation is applied across all incoming states from predecessor blocks, for example, following Algorithm 3 (above). The path context Γ is obtained for each incoming edge and then applied to the symbolic store Δ. For example, for the edge from B1 to B3 in FIG. 2, Δ is updated to {y→Γ₁ [Λ→Δ[y]]=ite(x>1, y₀, -)}. To merge Δ's or Γ's from paths that merge to the same confluence point, the following recursive merge operation M may be applied to each symbolic value:

$$M(v_1,-)=v_1;$$

$$M(-,v_2)=v_2;$$

$$M(ite(e,v_1,v_2),ite(e,v'_1,v'_2))=ite(e,M(v_1,v'_1),M(v_2,v'_2))$$

This way, at the last node of FIG. 2, the value of y will be M(ite(x>1, 42, -), ite(x>1, -, ite(x<42, 17, y₀))), which may be merged to ite(x>1, 42, ite(x<42, 17, y₀)), capturing all possible paths. During SSE, MergePoint keeps a mapping from each traversed node to the corresponding state (OUT). Sharing in the algorithm above may be improved by making the gating path expression in Line 12 common for all merged variables (e.g., Δ[u]=ite(M(Γ₁ [Λ→true], Γ₂[Λ→false]),Δ₁ [u], Δ₂[u])).

For handling an overapproximate CFG, at any point during SSE, the path predicate may be computed as the conjunction of the DSE predicate Π_DSE and the SSE predicate computed by substitution: Π_SSE=Γ[Λ→true, -→false]. According to various example embodiments of the methods and systems discussed herein, the resulting predicate is used to perform path pruning (e.g., lines 4 and 6 in Algorithm 3). This may have the effect of providing two benefits: (1) any infeasible edges introduced by the CFG recovery step are eliminated, and (2) the resulting formulas only consider feasible paths.

To finalize transition points (e.g., fork points), after any given SSE pass (e.g., an SSE phase in an automatic software test) is complete, the example embodiments of the methods and systems discussed herein may check which states are to be forked. To do this, the transition points are gathered and checked for whether they were reached by SSE (e.g., line 16 in Algorithm 1). For the set of distinct (e.g., based on their jump target address) transition points, various example embodiments of the methods and systems discussed herein will fork a new symbolic state in a Finalize operation (e.g., a Finalize step), in which a DSE executor is created (l, Π, Δ) using the state (Γ, Δ) of each transition point.

To generate test cases for the software code, a software testing machine could generate an input for each covered path, but that would result in an exponential increase in the size of the CFG_e and the resulting exponential increase in the number of test cases generated. Accordingly, by default, various example embodiments of the systems and methods discussed herein output only one test case per CFG node that was explored by SSE. However, in some example embodiments, multiple test cases per CFG node are output. For example, for increased branch coverage, some example embodiments are configured (e.g., modified) to generate a test case for every edge of the CFG. In alternative example embodiments, the number of test cases can be minimized by generating test cases only for nodes that have not been covered by previous test cases.

For handling an underapproximate CFG, before proceeding with DSE (e.g., a subsequent DSE phase of an automatic software test), veritesting may check whether any paths were missed due to the underapproximate CFG. To do so, veritesting may query the negation of the path predicate at the Exit node (e.g., the disjunction of the path predicates of forked states). If the query is satisfiable, an extra state is forked to explore missed paths.

According to certain example embodiments of the methods and systems discussed herein, veritesting is implemented as an online algorithm. Accordingly, it can run as the software code (e.g., program to be tested) executes. If any operation of the veritesting algorithm fails, the methods and systems discussed herein may failover back to DSE until the next symbolic branch. This may provide the pragmatic benefit of allowing the veritesting implementation to be gradually deployed. For example, supporting all possible programming constructs is optional, since veritesting can be run on a best-effort basis.

Figure 3:
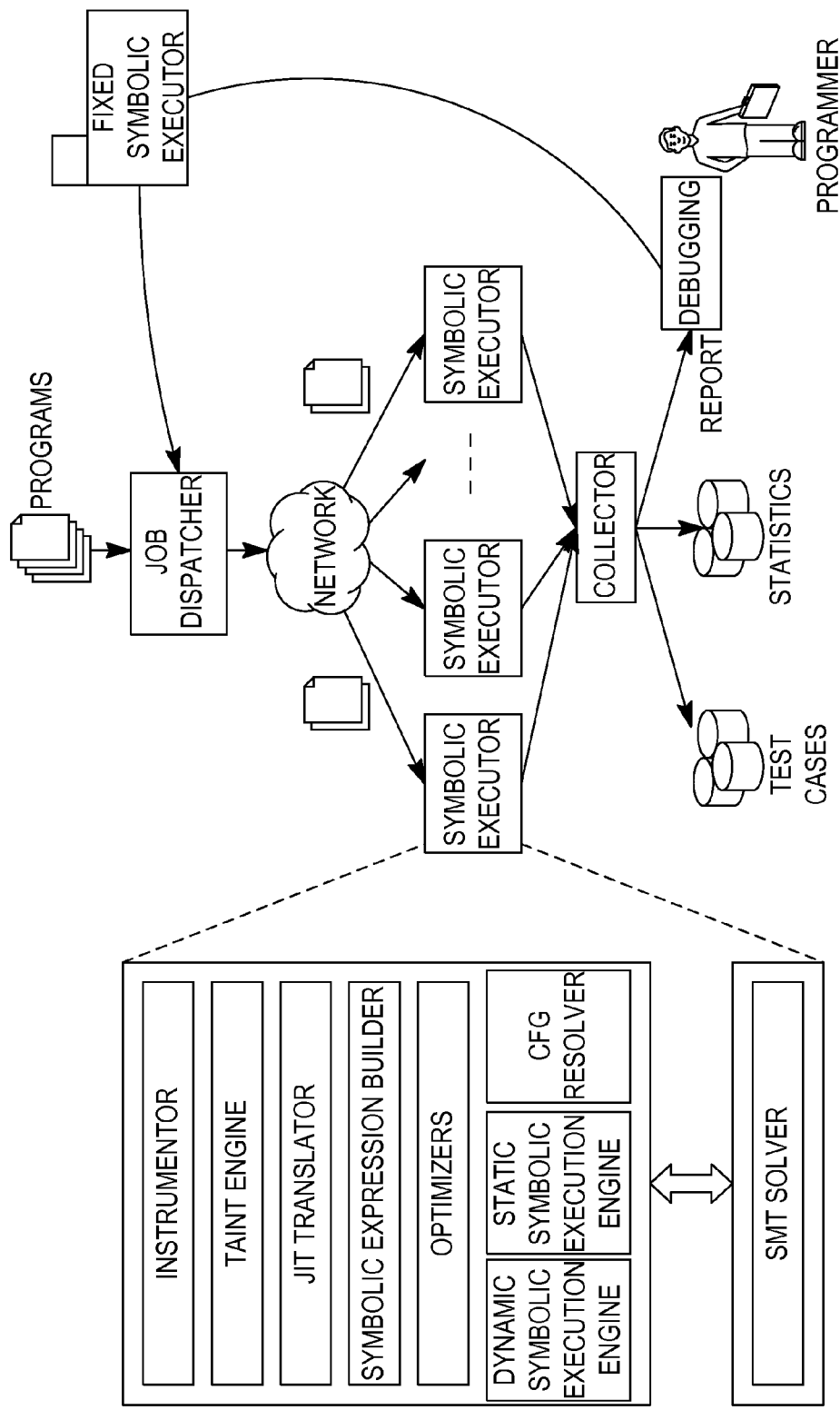
FIG. 3 is a block diagram illustrating a system architecture suitable for software code testing, according to some example embodiments.

Regarding suitable system architectures for veritesting, FIG. 3 illustrates a system architecture, according to some example embodiments. Various example embodiments of the methods and systems discussed herein are configured to perform effective automatic software testing on thousands of software applications. Below is a high-level description of an example system, as well as various design features.

As shown in FIG. 3, a symbolic executor (e.g., a symbolic execution engine) may be configured similarly to a concolic executor. The symbolic executor may run on top of an instrumentation tool, and x86 instructions may be just-in-time (JIT) compiled to an intermediate representation before being symbolically executed. A taint analysis layer may assist by ensuring that the symbolic executor is used only when needed (e.g., only for instructions operating on input-derived data). The various layers of the symbolic executor, according to certain example embodiments, are shown on the left of FIG. 3.

For veritesting, the symbolic executor shown in FIG. 3 may be enhanced with two special modules: a static symbolic executor (e.g., SSE module) and a CFG module (e.g., CFG resolver or CFG recovery module).

As a standalone tool (e.g., within a distributed infrastructure), the symbolic executor shown in FIG. 3 accesses software code (e.g., takes in a program) to be tested, as well as a user configuration (e.g., including a time limit, inputs, or any suitable combination thereof), and outputs test cases, bugs, statistics, or any suitable combination thereof. The symbolic executor (e.g., as all or part of a distributed network-based system) may be configured to test software en masse (e.g., hundreds or thousands of different software programs). However, in experiments conducted, a single 30-minute test on 1,000 programs ran for almost 3 weeks of processor time. To scale the techniques discussed herein, a distributed infrastructure was developed to utilize multiple nodes to run programs in parallel. FIG. 3 illustrates end-to-end architecture of the scalable system for automatic software testing.

The example system shown in FIG. 3 employs a first-come, first-served central queue policy. A program waiting at the top of the dispatcher queue will be sent to the next available instance of the symbolic executor. Such a policy yields high-utilization.

Data generated at every node may be aggregated and stored in centralized storage. The stored data may be used as immediate feedback about the performance (e.g., behavior) of the symbolic executor on a large number of programs. Based on experiments conducted, this feedback guided several design choices, including use of a hash-consed language, as described below.

Figure 4:
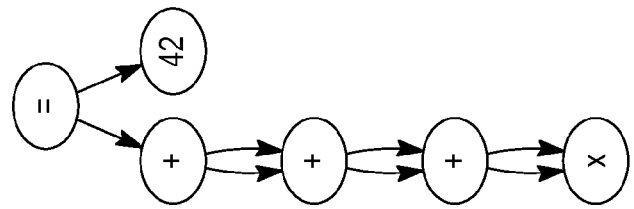
FIG. 4 is a conceptual diagram illustrating hash consing, according to some example embodiments.
Figure 4:
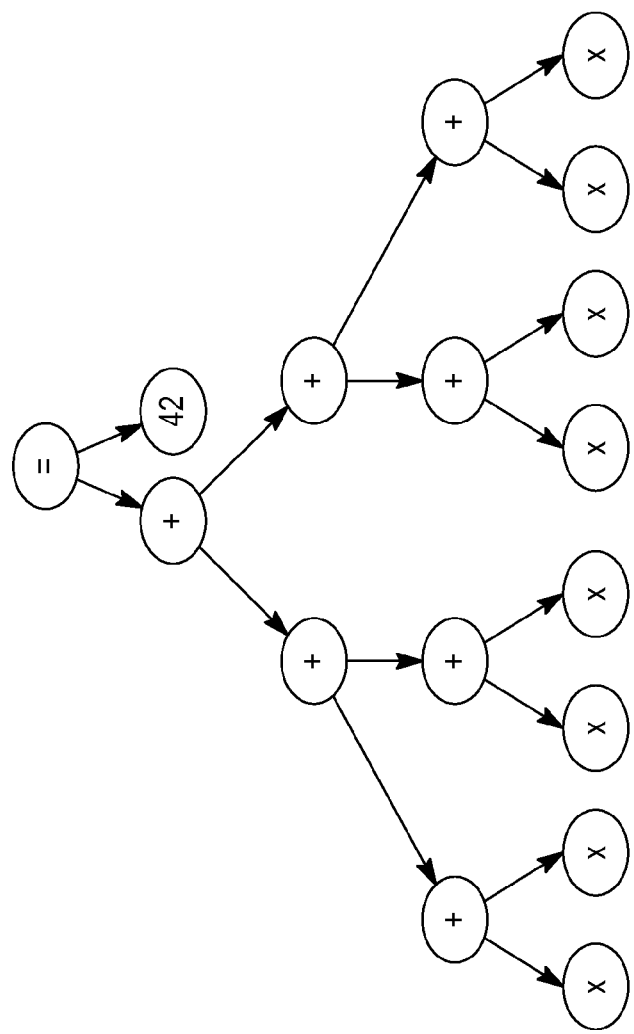

Whenever a program variable is used in an expression, the eval statement in Algorithm 1 substitutes the program variable with its value in the symbolic store. However, in some situations, naïve substitution algorithm may be vulnerable to an exponential blowup, even for a straightline program. Hash-consing may mitigate this vulnerability. FIG. 4 illustrates hash consing, according to some example embodiments. For example, the path predicate for the nodes shown in FIG. 4 is s+s+s+s+s+s+s+s=42, where there are $2^3$=8 x's.

Hash-consing [25] is a technique for avoiding duplication during substitution and reusing previously constructed expressions. Previous work in symbolic execution used variants of hash-consing to avoid duplicate expressions. Examples include creating maximally-shared graphs [24], using expression caching [4], or ensuring that structurally equivalent expressions that are passed to the SMT solver are reused [3].

However, various example embodiments of the methods and systems discussed herein take a step further and build hash-consing into the programming language. Accordingly, the constructor for every expression type is hash-consed by default, meaning that the implementor of the symbolic executor is incapable of creating duplicate expressions. Every previously computed expression may be stored for potential reuse. In addition, certain example embodiments also provide iterators over hash-consed expressions for standard operations (e.g., fold, map, or map-reduce) to ensure all traversals are linear in the size of the expression. In some example embodiments, hash-consed expressions are stored in an array of weak references and can therefore be efficiently garbage collected.

According to various example embodiments, a software testing machine (e.g., as all or part of a software testing system of multiple software testing machines) is designed and configured to run in a virtual machine cloud (e.g., a cloud-based system configured to provide software testing services to client devices). Such an architecture may use a central dispatcher to send individual programs to analysis nodes (e.g., individual software testing machine). The main system and its veritesting implementation may be built on top of MAYHEM [5], and may include an additional 17,000 lines of OCaml and 9,000 lines of C/C++. The communication between multiple nodes (e.g., between or among multiple software testing machine) and the dispatcher may be implemented in 3,500 lines of Erlang. The main system may use the BAP [20] platform for translating x86 code to an intermediate representation, CFG recovery, and loop unrolling. In addition, the main system may use PIN [22] for instrumentation and Z3 [21] for solving SMT queries.

An example embodiment of the systems discussed herein, configured to implement an example embodiment of the methods discussed herein, was evaluated against multiple benchmarks. These evaluations found that the evaluated system, when used to find software bugs in software code, found twice as many software bugs compared to previous approaches. In addition, the evaluated system showed improved node coverage compared to DSE alone. Furthermore, although DSM outperforms DSE [8], the evaluated system exhibited improved path coverage and outperformed both DSM and DSE alone.

For these evaluations, a large-scale experiment was conducted on the example system, implementing an example embodiment of the methods discussed herein, on 33,248 distinct programs from Debian Linux. The example system generated billions of SMT queries, hundreds of millions of test cases, millions of crashes, and found 11,687 distinct software bugs.

Overall, the example system with veritesting showed improvements on all three metrics discussed above, namely, 1) node coverage, 2) path coverage, and 3) the number of unique bugs. The example system also proved to be effective at checking a large number of programs.

In performing the evaluations, all experiments on the example system were distributed among a private cluster consisting of 100 virtual nodes (e.g., virtual software testing machines) running Debian Squeeze on a single Intel 2.68 GHz Xeon processor with 1 GB of RAM. For comparison, the approaches of previous systems were implemented and executed on a single node Intel Core i7 processor and 16 GB of RAM, since the approaches of previous systems did not run on a distributed infrastructure.

Three benchmarks were used for the evaluations: GNU coreutils, BIN, and Debian. GNU coreutils and BIN were compiled such that coverage information could be collected via gcov. The Debian benchmark includes binaries used by millions of users worldwide.

Regarding the first benchmark, GNU coreutils included 86 programs to be tested and was selected because 1) the coreutils suite was originally used by KLEE [3] and other researchers [3, 27, 8, 5, 26] to evaluate prior systems, and 2) configuration parameters for these programs to work with prior approaches are publicly available [46]. Numbers reported with respect to GNU coreutils do not include library code to remain consistent with compared work. Unless otherwise specified, each program in this suite was tested and run for 1 hour. All generated test cases were executed natively to compute code coverage results. To avoid destructive side-effects, three GBU coreutils (rm, rmdir and kill) were removed from the original KLEE suite.

Regarding the second benchmark, the BIN suite included 1,023 programs to be tested. First, all of the binaries located under the /bin, /usr/bin, and /sbin directories from a default Debian Squeeze installation were obtained. The binaries that read from /dev/stdin or from a file specified on the command line were kept (e.g., selective or otherwise included for testing). However, all programs that relied upon user interaction (e.g., GUIs) were filtered out (e.g., deselected or otherwise excluded from testing). After preprocessing, the BIN suite contained 1,023 binaries and included a total of 2,181,735 executable lines of source code, as reported by gcov. The BIN benchmark includes library code packaged with the application in the data set, making it more conservative than GNU coreutils. For example, an application may include an entire library, but only one function is reachable from the application. Nonetheless, all uncovered lines from the library source file were included in computing node coverage. Unless otherwise specified, each program in this suite was tested and run for 30 minutes.

The third benchmark included all binaries from Debian Wheezy and Debian Sid. Specifically, the binaries and shared libraries from every package available from the primary (e.g., main) Debian repository were extracted. This extraction downloaded 23,944 binaries from Debian Wheezy and 27,564 binaries from Debian Sid. After discarding duplicate binaries and binaries that did not run, there were 33,248 binaries to be tested for the third benchmark. This represents an order of magnitude more applications than the number of applications tested by prior research on symbolic execution. The example system analyzed each application in the third benchmark for less than 15 minutes per experiment.

Table 2 below shows the number of software bugs found with the example system during the evaluations, with and without veritesting. Overall, for the first benchmark, BIN, the automatic software tests with veritesting found about two times more bugs than the automatic software test without veritesting. Moreover, the automatic software tests with veritesting found 85 additional distinct crashes that traditional symbolic execution approaches could not detect.

TABLE 2

Veritesting found 2x more bugs than DSE alone

|  | Veritesting | DSE alone |
| --- | --- | --- |
| GNU Coreutils | 2 bugs/2 programs | 0 bugs/0 programs |
| BIN | 148 bugs/69 programs | 76 bugs/49 programs |

With veritesting, the example system also found two previously unknown crashes in GNU coreutils, despite the applications in GNU coreutils having been previously and thoroughly tested with symbolic execution by numerous researchers [3, 26, 27, 8, 5,] using prior approaches. Further investigation showed that the GNU coreutils crashes originated from a library bug that remained undetected for 9 years.

As a point of comparison, the example system also ran Kuznetsov's DSM implementation [8], which missed the software bugs newly discovered by the example system. The example system with veritesting was also compared to a control system running S2E [28], a recently developed binary-only symbolic execution system. The control system also missed the software bugs newly discovered by the example system. By the time these evaluations were conducted, the likelihood of discovering new software bugs in GNU coreutils had grown relatively low. KLEE [3] stated that GNU coreutils had become the single most well-tested suite of open-source applications, and since then, GNU coreutils had also become the de facto standard for evaluating bug-finding systems that utilized symbolic execution. Therefore, the ability of the example system to discover new ways to crash GNU coreutils is evidence that veritesting uncovers deep software bugs that were previously beyond the reach of symbolic execution.

The example system, both with and without veritesting, was also evaluated with respect to node coverage. Table 3 below shows the overall results. Veritesting improved node coverage on average in all cases tested. The example system also achieved 27% more code coverage on average than a control system running S2E. Any positive increase in node coverage is generally considered important. Kuznetsov et al. showed both DSM and SSE reduced (not improved) node coverage compared to DSE alone [8, FIG. 8].

TABLE 3

Veritesting improved node coverage compared to DSE alone

|  | Veritesting | DSE | Difference |
| --- | --- | --- | --- |
| GNU Coreutils | 75.27% | 63.62% | +11.65% |
| BIN | 40.02% | 34.71% | +5.31% |

Figure 5:
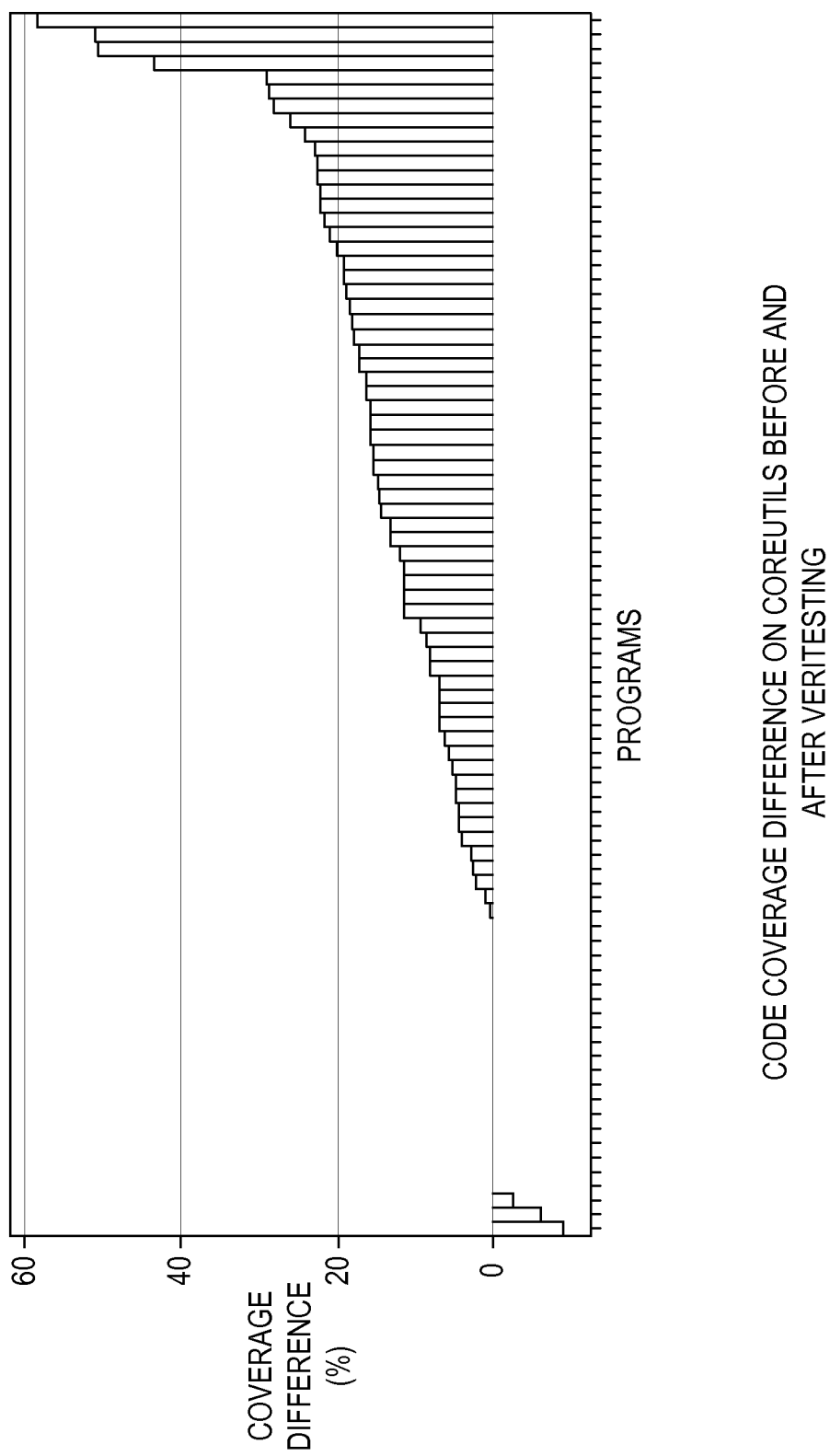
FIG. 5 is a graph of code coverage differences versus programs before and after testing a first benchmark, according to some example embodiments.
Figure 6:
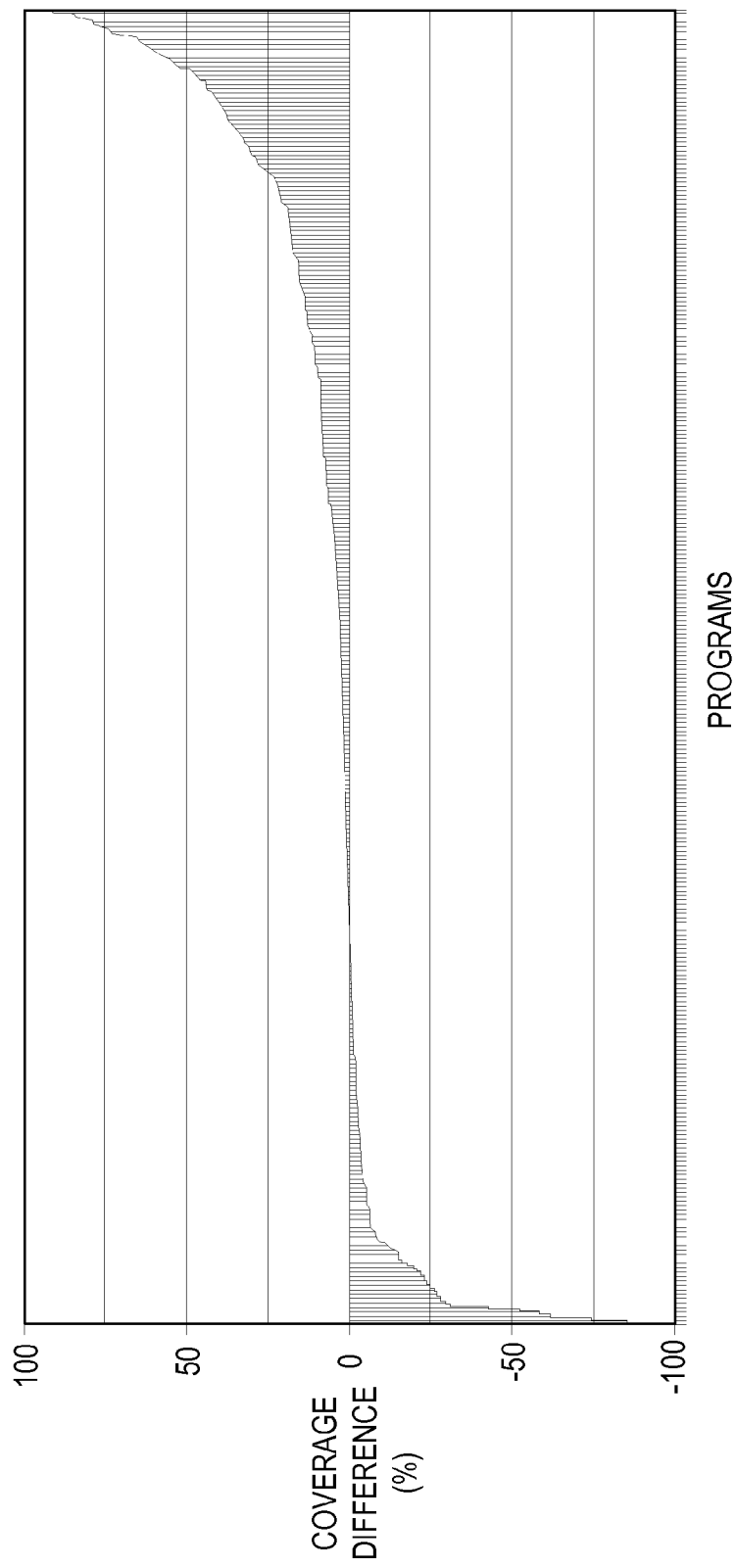
FIG. 6 is a graph of code coverage differences versus programs before and after testing a second benchmark, according to some example embodiments.

FIGS. 5 and 6 are graphs that illustrate the differences in code coverage (e.g., node coverage) by the example system in running the first and second benchmarks, respectively, with and without veritesting. As shown in FIG. 5, for the first benchmark, GNU coreutils, veritesting resulted in decreased node coverage for only three programs (md5sum, printf, and pr), while node coverage increased for a large majority of the programs. Manual investigation of these three programs showed that the example system with veritesting was generating much harder formulas, and more than 90% of the processing time was spent in the SMT solver, which resulted in timeouts. In FIG. 6, for the second benchmark, BIN, programs for which node coverage was the same with and without veritesting have been omitted for readability. Overall, the BIN performance improved on 446 programs and was reduced on 206 programs.

Figure 7:
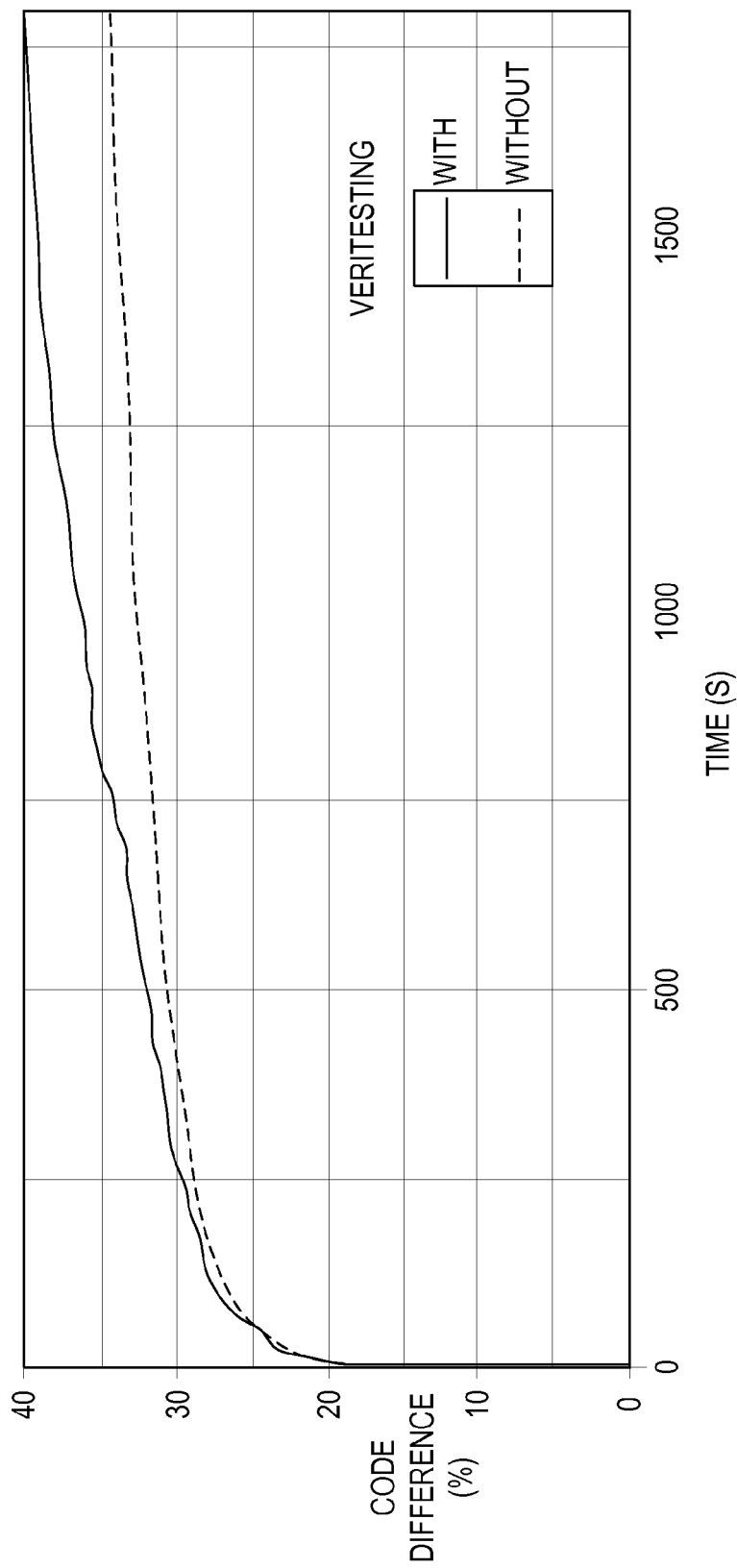
FIG. 7 is a graph of code coverage versus time before and after testing a second benchmark, according to some example embodiments.

FIG. 7 shows the average coverage versus time achieved by the example system with and without veritesting in running the second benchmark, the BIN suite. After 30 minutes of automatic software testing, the example system without veritesting reached 34.45% code coverage. However, the example system with veritesting achieved the same coverage in 12 minutes and 48 seconds, less than half the time taken without veritesting. The coverage improvement offered by veritesting becomes more substantial as time goes on. At the end of this experiment, the example system with veritesting also had a higher coverage velocity (e.g., the rate at which new coverage is obtained) compared to standard symbolic execution. The difference of velocity means that, over a longer period of time, the coverage difference between the two techniques is likely to increase further, showing that the longer the system runs, the more influential veritesting becomes for attaining high code coverage.

Figure 8:
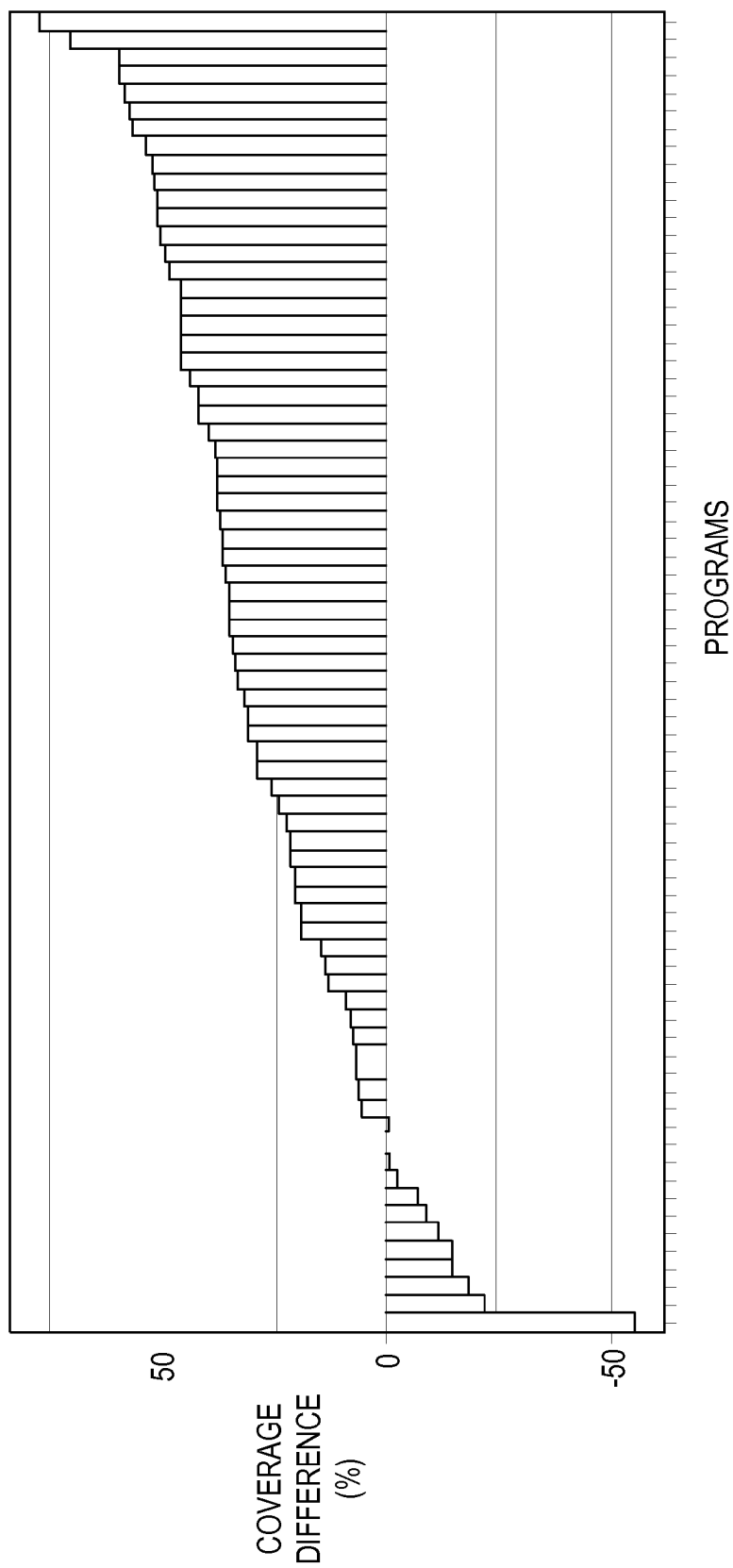
FIG. 8 is a graph of code coverage differences versus programs, according to some example embodiments.

The above evaluations of the example system demonstrate several improvements and benefits of veritesting. In additional experiments, both a control system configured to perform S2E and the example system with veritesting tested GNU coreutils using the same configuration for one hour on each utility within GNU coreutils. For fair comparison, these additional experiments excluded 11 programs where S2E emits an assertion error. FIG. 8 is a graph that compares the increase in code coverage (e.g., node coverage) obtained by the example system over the S2E control system. The example system achieved 27% more code coverage on average than S2E control system. Where the S2E control system outperformed the example system with veritesting, an investigation was performed for each particular program.

As an example, for pinky—the main outlier in the distribution—the S2E control system achieved 50% more coverage than the example system with veritesting. It turned out that the main reason for this difference is that pinky uses a netlink socket to communicate with the kernel, and the particular implementation of the example system did not handle this system call.

The example system was also evaluated for path coverage, both with and without veritesting, using three different metrics: time to complete exploration, multiplicity, and fork rate. The time to complete exploration was calculated by first determining (e.g., identifying) those programs where all paths were exhausted. Next, the performance of the example system was measured by the amount of time spent by the example system in exploring all paths.

The number of paths checked by an exhaustive DSE approach is also the total number of paths possible. In such cases, it is possible to measure a) whether veritesting also completed, and b) how long it took veritesting to exhaust all paths relative to DSE alone. The example system without veritesting was able to exhaust all paths for 46 programs. The example system with veritesting completed all paths 73% faster than without veritesting. This result shows that veritesting provides improved speed for reaching the same end goal.

Multiplicity was proposed by Kuznetsov et al. [8] as a metric correlated with path coverage. The initial multiplicity of a state is 1. When a state forks, both children inherit the state multiplicity. When combining two states, the multiplicity of the resulting state is the sum of their multiplicities. A higher multiplicity indicates higher path coverage.

Figure 9:
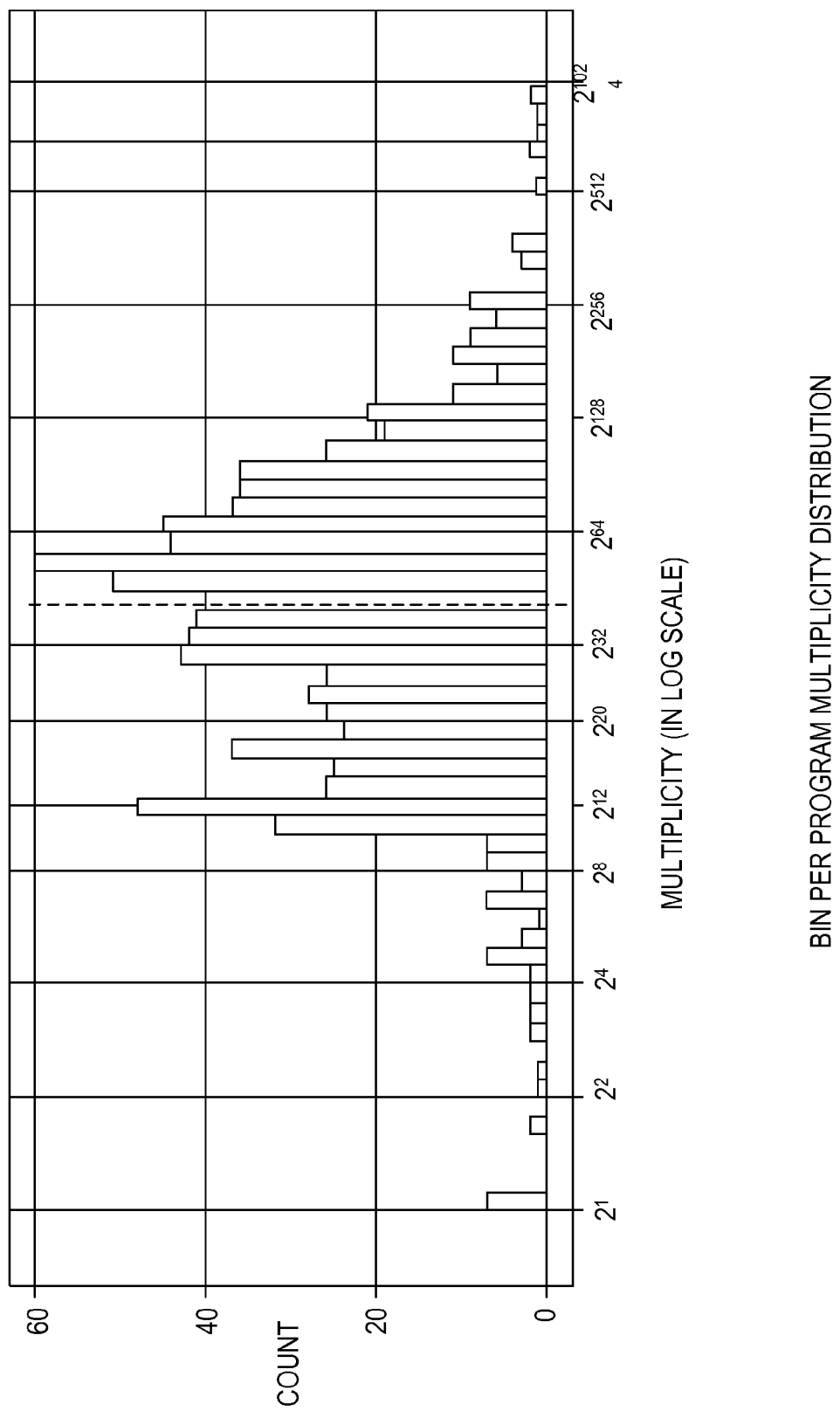
FIG. 9 is a graph showing program multiplicity distribution for the second benchmark, according to some example embodiments.

The example system with veritesting was evaluated for multiplicity rate. While exhaustion provides an exact comparison, multiplicity rate provides an approximation as proposed by [8]. FIG. 9 is a graph that shows the state multiplicity probability distribution function for the second benchmark, BIN. The average multiplicity over all programs reached $1.4 \times 10^{290}$, and the median $1.8 \times 10^{12}$. As previously mentioned, higher multiplicity is better. The distribution shown in FIG. 9 resembles a lognormal with an abnormal spike for programs with multiplicity of 4,096 ($2^{12}$). Further investigation showed that 72% of those programs came from the netpbm family of programs within BIN. The example system with veritesting did not achieve even higher multiplicity due to the presence of unresolved calls in the recovered CFG. Improving the CFG recovery phase would improve performance even further. Even with a multiplicity of 4,096, the example system with veritesting still improves code coverage by 13.46% on the netpbm utilities in BIN. The multiplicity average and median for the first benchmark, GNU coreutils, were $1.4 \times 10^{199}$ and $4.4 \times 10^{11}$, respectively. Again, multiplicity had high variance, and thus the median is likely a better performance estimator.

The third metric used in the evaluation of the example system was the fork rate of an executor. Considering a single path formula for a single execution, if the path has b new branches, then there are b new symbolic executors to potentially fork (e.g., spawn or otherwise instantiate). It may therefore be useful to measure b as the fork rate (e.g., representing the remaining obligations in order to completely explore all execution paths). If the state space is represented as a tree, where each node is a path, and its child nodes are the new forked paths after exploring the path, then the fork rate is the fan-out factor of each node. A lower fork rate is better, because it indicates a potential for an exponentially smaller state space. For example, a tree of height n with a fan-out factor of 5 has approximately $5^n$ nodes. For a fan-out factor of 10, the tree will have roughly $10^n$ nodes. Therefore, a tree with a fan-out factor of 5 is $2^n$ smaller than a tree with a fan-out factor of 10.

Figure 10:
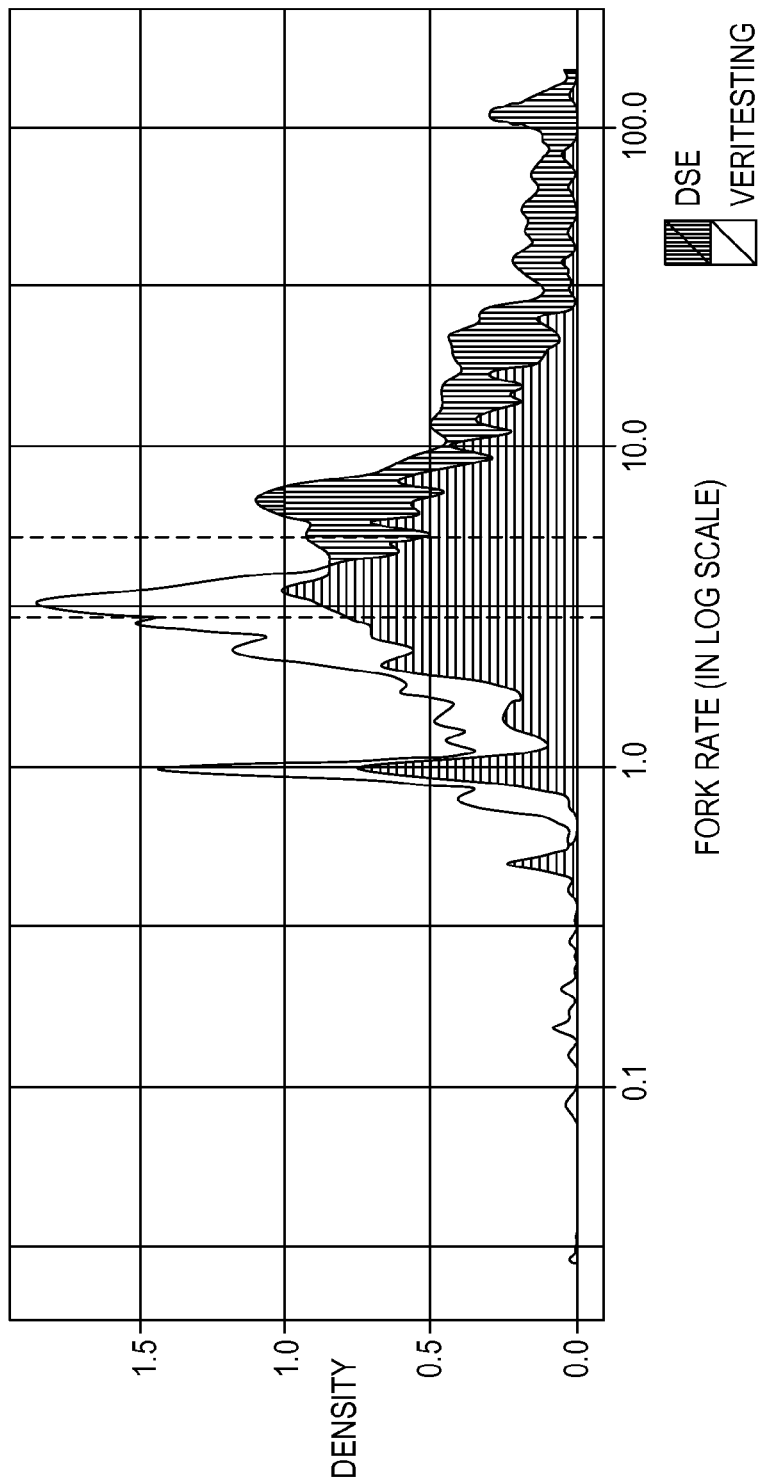
FIG. 10 is a graph showing fork rate distribution with and without testing the second benchmark, according to some example embodiments.

FIG. 10 is a graph that shows the fork rate distribution for the example system, with and without veritesting, in running the second benchmark, BIN. FIG. 10 shows that the example system with veritesting decreased the average fork rate by 65% from 13 to 4.6, and the median decreased by 44%. As previously noted, a lower fork rate is better. In other words, the example system without veritesting had 13 new paths (forks) to explore for every analyzed path. However, the example system with veritesting had only 4.6 new paths to explore for every analyzed path. Thus, for the BIN programs in the second benchmark, veritesting reduced the state space by a factor of $$\left(\frac{4.6}{13}\right)^n \approx 3^n,$$

where n is the depth of the state space. This represents an exponential reduction of the space, allowing symbolic execution to consider exponentially more paths during each analysis.

In addition, the example system with veritesting was evaluated for its bug-finding ability on every program available in Debian Wheezy and Debian Sid. The results indicated that veritesting enables large-scale bug finding.

The example system was used to automatically test 33,248 binaries with veritesting. At this scale, any type of per-program manual labor becomes impractical. A single consistent input specification was used for all binaries: -sym-arg 1 10-sym-arg 2 2-sym-arg 3 2-sym-anon-file 24-sym-stdin 24. The example system encountered at least one symbolic branch in 23,731 binaries. For these automatic tests, the example system analyzed each of the Debian Wheezy binaries once and analyzed each of the Debian Sid binaries twice (one experiment with a 24-byte symbolic file, the other experiment with 2100 bytes to find buffer overflows). Including data processing, these experiments took 18 processor-months.

The overall results of these experiments are shown in Table 3 below. The example system with veritesting found 11,687 distinct software bugs that crash programs (e.g., by stack hash). The software bugs appeared in 4,379 of the 33,248 programs. The example system with veritesting also found software bugs that are potential security threats. For example, 224 crashes had a corrupt stack (e.g., a saved instruction pointer had been overwritten by user input). Those crashes are likely exploitable, and the example system had already confirmed exploitability of 152 programs.

TABLE 3

| Overall numbers for checking Debian | |
|---|---:|
| Total programs | 33,248 |
| Total SMT queries | 15,914,407,892 |
| Queries hitting cache | 12,307,311,404 |
| Symbolic instrs | 71,025,540,812 |
| Run time | 235,623,757 s |
| Symb exec time | 125,412,247 s |
| SAT time | 40,411,781 s |
| Model gen time | 30,665,881 s |
| # test cases | 199,685,594 |
| # crashes | 2,365,154 |
| # unique bugs | 11,687 |
| Confirmed control flow hijack | 152 |

Figure 11:
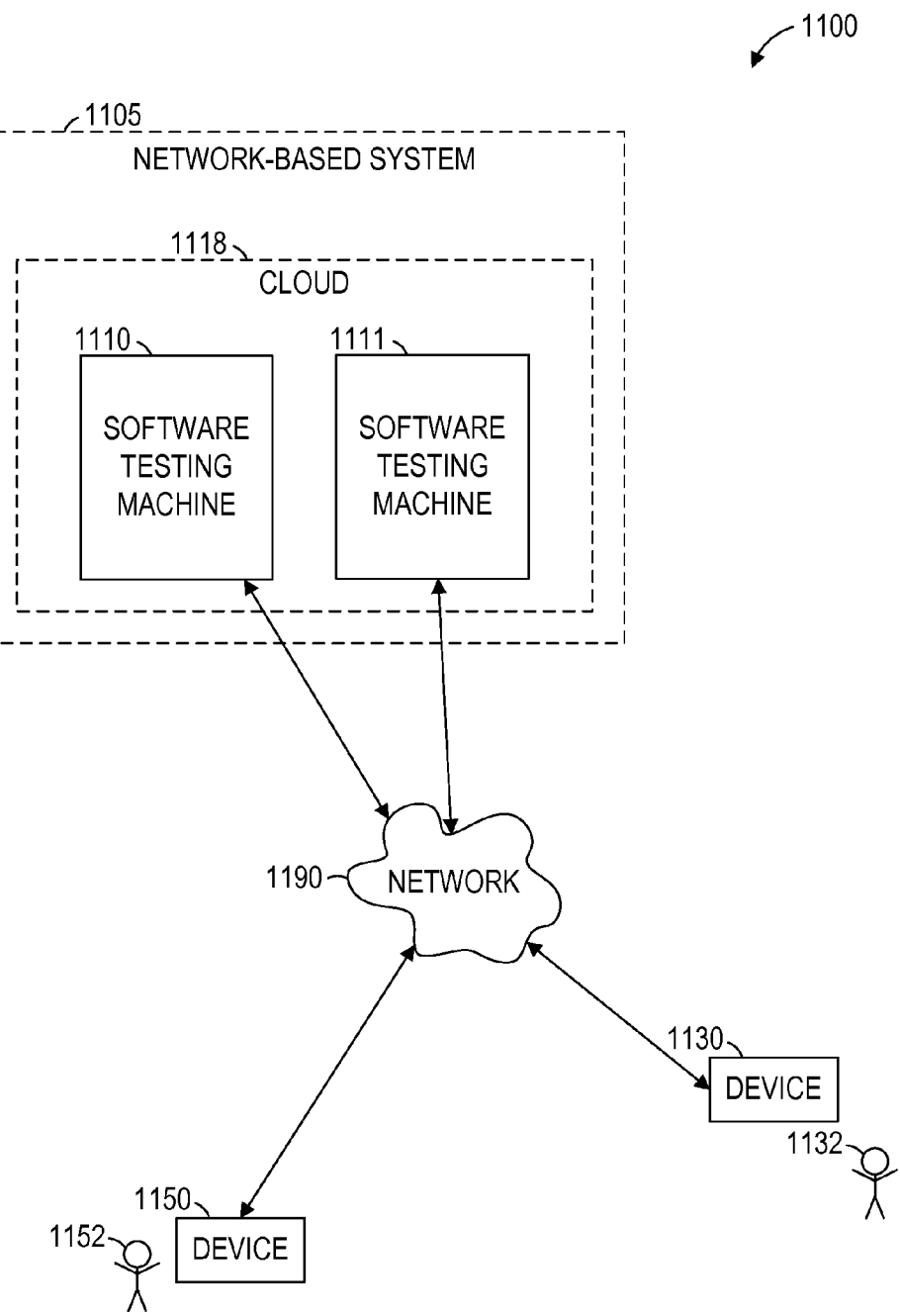
FIG. 11 is a network diagram illustrating a network (e.g., cloud) environment suitable for automatic testing of software code, according to some example embodiments.

FIG. 11 is a network diagram illustrating a network environment 1100 suitable for automatic testing of software code, according to some example embodiments. The network environment 1100 includes one or more software testing machines 1110, 1111, and devices 1130 and 1150 (e.g., developer devices or other computing devices), all communicatively coupled to each other via a network 1190. The one or more software testing machines 1110, 1111 may form all or part of a cloud 1118, which may in turn form all or part of a network-based system 1105 (e.g., a cloud-based server system configured to provide one or more automatic software testing services to the devices 1130 and 1150). The software testing machines 1110, 1111 and the devices 1130 and 1150 may each be implemented in a computer system, in whole or in part, as described below with respect to FIG. 17.

Also shown in FIG. 11 are users 1132 and 1152. One or both of the users 1132 and 1152 may be a human user (e.g., a human being), a machine user (e.g., a computer configured by a software program to interact with the device 1130), or any suitable combination thereof (e.g., a human assisted by a machine or a machine supervised by a human). The user 1132 (e.g., a programmer or developer) is not part of the network environment 1100, but is associated with the device 1130 and may be a user of the device 1130. For example, the device 1130 may be a desktop computer, a vehicle computer, a tablet computer, a navigational device, a portable media device, a smartphone, or a wearable device (e.g., a smart watch or smart glasses) belonging to the user 1132. Likewise, the user 1152 is not part of the network environment 1100, but is associated with the device 1150. As an example, the device 1150 may be a desktop computer, a vehicle computer, a tablet computer, a navigational device, a portable media device, a smartphone, or a wearable device (e.g., a smart watch or smart glasses) belonging to the user 1152.

Any of the machines or devices shown in FIG. 11 may be implemented in a special-purpose computer that has been modified (e.g., configured or programmed) by software (e.g., one or more software modules) to perform one or more of the functions described herein for that machine or device. For example, a computer system able to implement any one or more of the methodologies described herein is discussed below with respect to FIG. 17. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 11 may be combined into a single machine, and the functions described herein for any single machine, database, or device may be subdivided among multiple machines, databases, or devices.

The network 1190 may be any network that enables communication between or among machines, databases, and devices (e.g., the software testing machine 1110 and the device 1130). Accordingly, the network 1190 may be a wired network, a wireless network (e.g., a mobile or cellular network), or any suitable combination thereof. The network 1190 may include one or more portions that constitute a private network, a public network (e.g., the Internet), or any suitable combination thereof. Accordingly, the network 1190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 1190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 12:
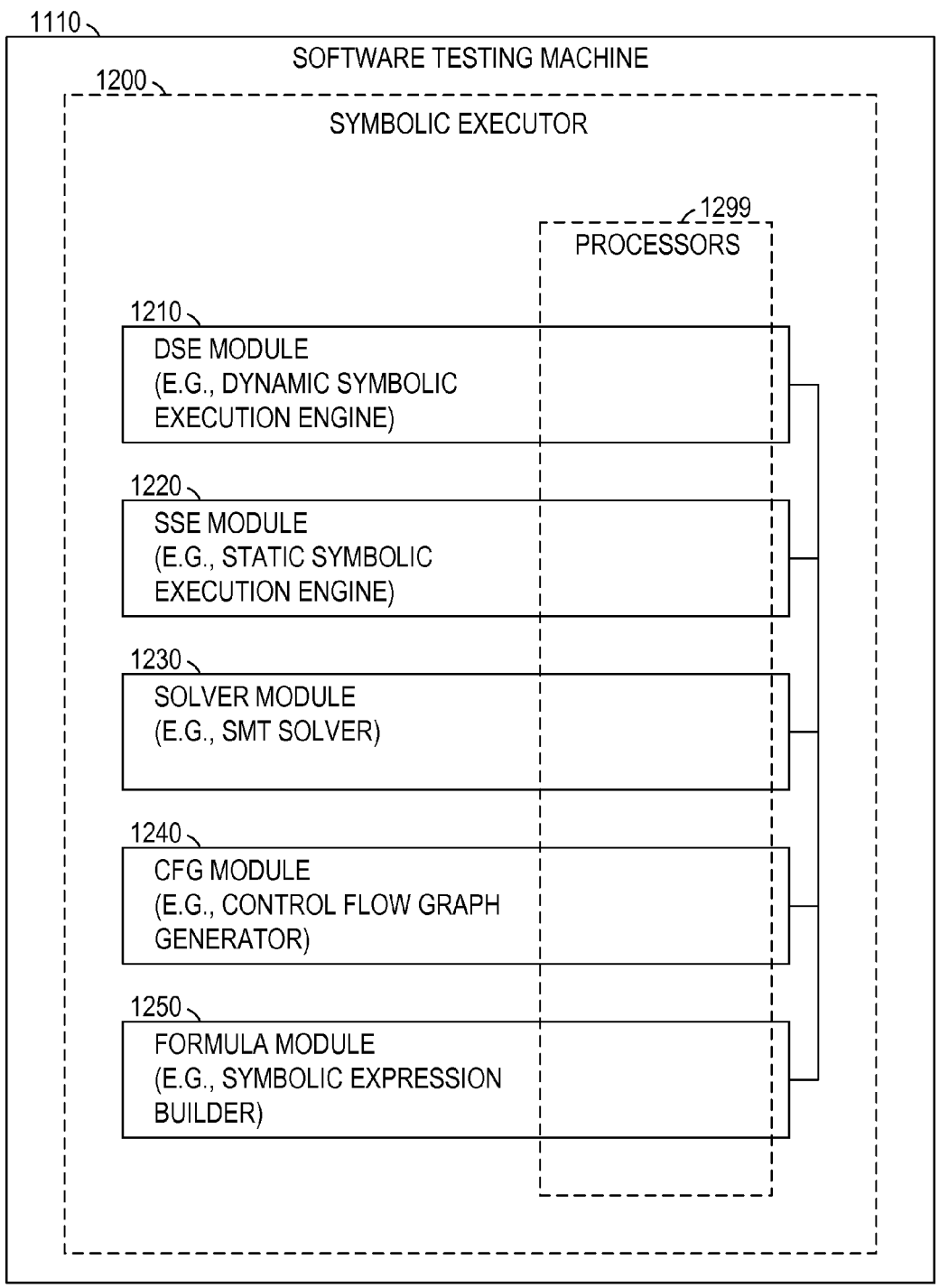
FIG. 12 is a diagram illustrating components of a software testing machine configured to perform automatic testing of software code, according to some example embodiments.

FIG. 12 is a diagram illustrating components of the software testing machine 1110, configured to perform automatic testing of software code, according to some example embodiments. The software testing machine 1110 is shown as including a DSE module 1210 (e.g., a dynamic symbolic execution engine, as discussed above with respect to FIG. 3), an SSE module 1220 (e.g., a static symbolic execution engine, as discussed above with respect to FIG. 3), a solver module 1230 (e.g., an SMT solver, as discussed above with respect to FIG. 3), a CFG module 1240 (e.g., a control flow graph generator, as discussed above with respect to FIG. 3), and a formula module 1250 (e.g., a symbolic expression builder, as discussed above with respect to FIG. 3), all configured to communicate with each other (e.g., via a bus, shared memory, or a switch). Any one or more of these modules may form all or part of a symbolic executor 1200 (e.g., discussed above with respect to FIG. 3).

Any one or more of the modules described herein may be implemented using hardware alone (e.g., one or more processors 1299 of a machine) or a combination of hardware and software. For example, any module described herein may physically include an arrangement of one or more processors 1299 (e.g., a subset of or among the one or more processors of the machine) configured to perform the operations described herein for that module. As another example, any module described herein may include software, hardware, or both, that configure an arrangement of one or more processors 1299 (e.g., among the one or more processors of the machine) to perform the operations described herein for that module. Accordingly, different modules described herein may include and configure different arrangements of such processors 1299 or a single arrangement of such processors 1299 at different points in time. Moreover, any two or more modules described herein may be combined into a single module, and the functions described herein for a single module may be subdivided among multiple modules. Furthermore, according to various example embodiments, modules described herein as being implemented within a single machine or device may be distributed across multiple machines or devices.

Figure 13:
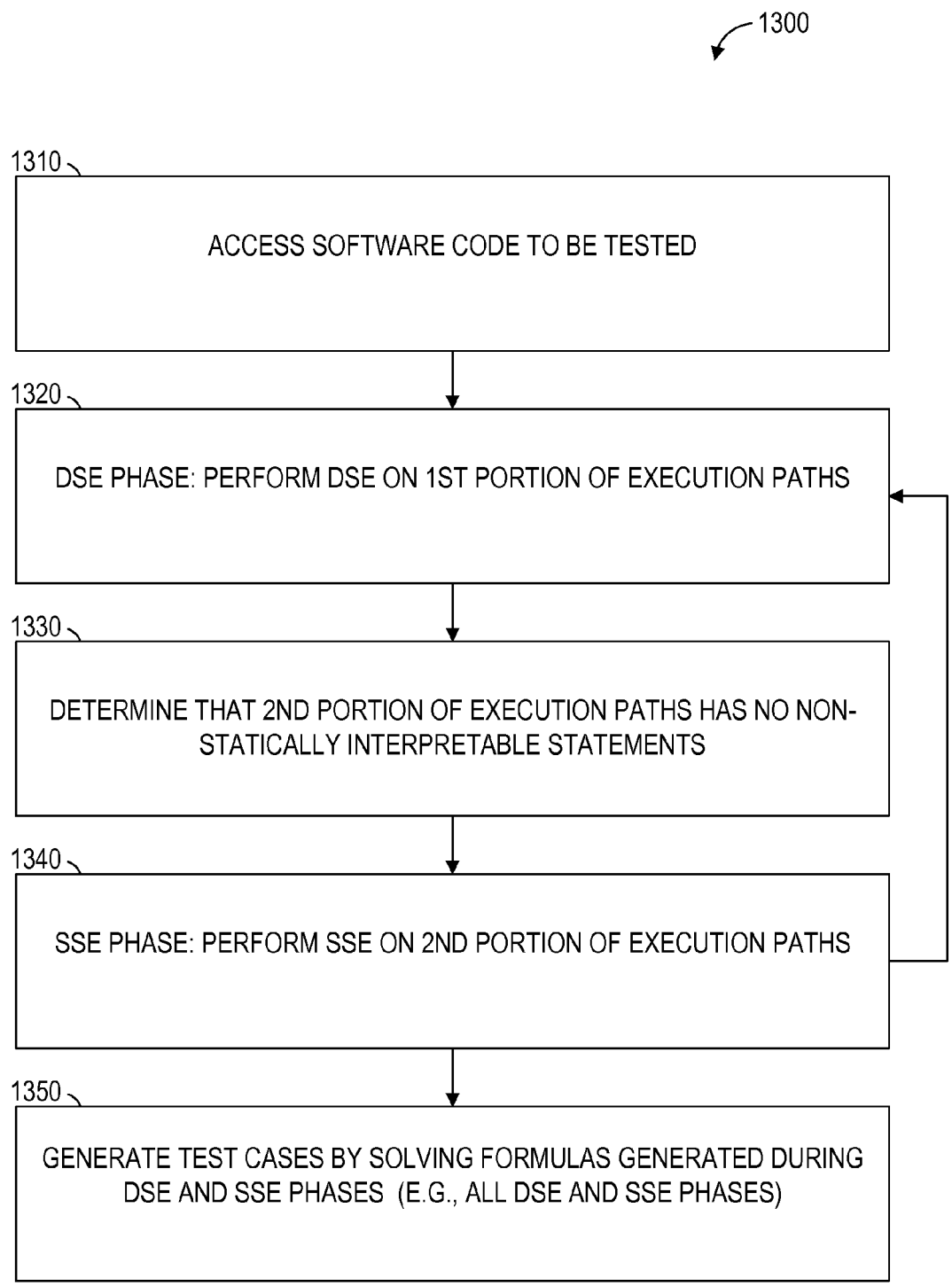
FIGS. 13-16 are flowcharts illustrating operations of a software testing machine in performing a method of automatically testing software code, according to some example embodiments.

FIGS. 13-16 are flowcharts illustrating operations of the software testing machine 1110 in performing a method 1300 of automatically testing software code, according to some example embodiments. Operations in the method 1300 may be performed using the modules described above with respect to FIG. 12. As shown in FIG. 13, the method 1300 includes operations 1310, 1320, 1330, 1340, and 1350.

In operation 1310, the DSE module 1210 accesses software code to be automatically tested. As noted above, the software code typically includes multiple execution paths through multiple executable statements (e.g., nodes) of the software code to be tested. According to various example embodiments, the software code may be accessed via the network 1190, from one or more of the devices 1130 and 1150 (e.g., in response to a user-submitted request for automatic testing of the software code), from a data repository within the cloud 1118 or within the network-based system 1105, or any suitable combination thereof.

In operation 1320, the DSE module 1210 performs a dynamic phase (e.g., DSE phase) of an automatic test of the software code. Specifically, the DSE module 1210 performs DSE on a portion (e.g., a first portion) of the execution paths of the software code. As noted above, DSE forks a separate symbolic executor for each execution path processed. Hence, performance of operation 1320 results in the forking of a separate symbolic executor for each execution path in a first portion of the execution paths of the software code being tested. As discussed above, each forked symbolic executor generates a corresponding formula for the corresponding execution path. In some example embodiments, the generation of one or more of these formulas is performed by the formula module 1250 (e.g., as requested or directed by the DSE module 1210).

In operation 1330, the SSE module 1220 determines that another portion (e.g., a second portion) of the execution paths is devoid of non-statically interpretable executable statements. As noted above, such non-statically interpretable executable statements may include system calls, unresolved jumps, other executable statements that are not statically interpretable, or any suitable combination thereof.

In operation 1340, the SSE module 1220 performs a static phase (e.g., an SSE phase) of the automatic test of the software code. Specifically, the SSE module 1220 performs SSE on the portion (e.g., the second portion) of the execution paths determined in operation 1330 to be devoid of non-statically interpretable executable statements. This SSE phase of the automatic test may be initiated in response to performance of operation 1330 or the result thereof. As discussed above, SSE generates at least one formula that corresponds to all executable statements in the portion (e.g., the second portion) of the execution paths processed. Accordingly, all of the executable statements in a second portion of the execution paths may collectively correspond to the one or more formulas generated in operation 1340. In some example embodiments, the generation of one or more of these formulas is performed by the formula module 1250 (e.g., as requested or directed by the SSE module 1220). In FIG. 13, a loopback arrow is provided to indicate that the software testing machine 1110 may repeatedly execute operations 1320, 1330, and 1340, or similar operations, to dynamically and opportunistically alternate (e.g., switch) back and forth between DSE and SSE, as appropriate for various portions of the execution paths in the software code to be tested.

In operation 1350, the solver module 1230 generates a set of one or more test cases for the software code. This may be performed by solving the formulas generated during the dynamic and static phases (e.g., all of the DSE and SSE phases) of the automatic test of the software code.

Figure 14:
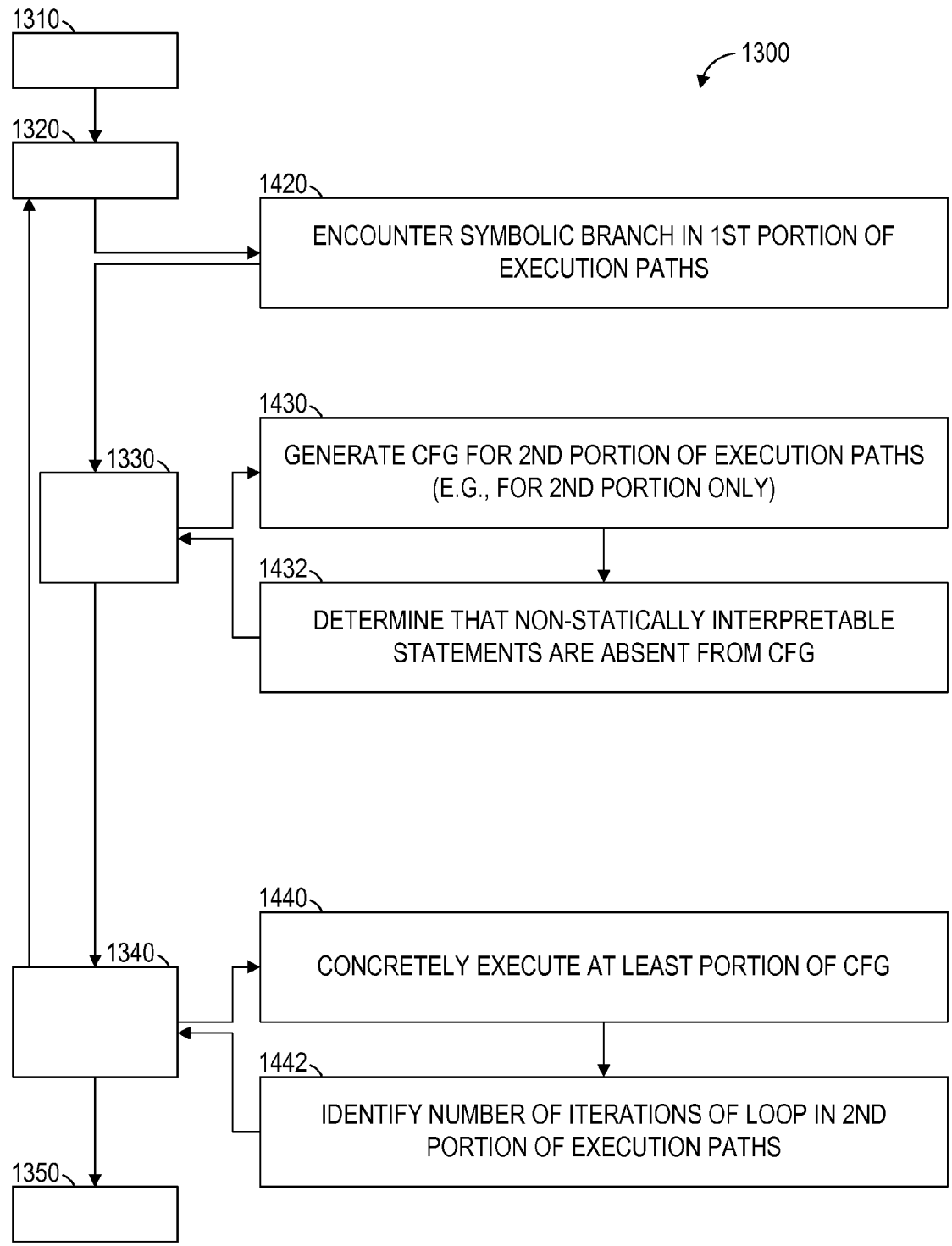

As shown in FIG. 14, the method 1300 may include one or more of operations 1420, 1430, 1432, 1440, and 1442. Operation 1420 may be performed during or after operation 1320, in which the DSE module 1210 performs a dynamic phase of the automatic test. In operation 1420, the DSE module 1210 encounters a symbolic branch within the first portion of the execution paths. This may cause the software testing machine 1110 to switch from DSE mode to SSE mode. According to various example embodiments, the encountering of the symbolic branch in operation 1420 causes the DSE module 1210 to terminate operation 1320 and causes the SSE module 1220 to initiate operation 1330. That is, operation 1330 may be performed in response to the DSE module 1210 encountering a symbolic branch within the first portion of the execution paths during performance of operation 1320.

As shown in FIG. 14, one or both of operations 1430 and 1432 may be performed as part (e.g., a precursor task, a subroutine, or a portion) of operation 1330, in which the SSE module 1220 determines that the second portion of the execution paths has no non-statically interpretable executable statements. In operation 1430, the SSE module 1220 generates a CFG that represents the second portion of the execution paths. The generated CFG may solely (e.g., only) represent this second portion of the execution paths, and the generated CFG therefore may be an intra-procedural partial CFG of the software code to be tested. In some example embodiments, the SSE module 1220 causes (e.g., by request or command) the CFG module 1240 to analyze the second portion and generate a corresponding CFG for the second portion.

In operation 1432, the SSE module 1220 analyzes the CFG generated in operation 1430 and determines that non-statically interpretable executable statements are absent from the generated CFG for the second portion of the execution paths. Accordingly, the SSE module 1220 can determine that the second portion of the execution paths are devoid of non-statically interpretable executable statements, as discussed above with respect to operation 1330. Thus, operation 1432 may provide a trigger for operation 1340, and operation 1340 may be performed in response to operation 1432 or the result thereof.

As shown in FIG. 14, one or both of operations 1440 and 1442 may be performed as part of operation 1340, in which the SSE module 1220 performs a static phase of the automatic test of the software code. In operation 1440, the SSE module 1220 concretely executes at least a portion of the CFG generated in operation 1430. As noted above, the CFG represents the second portion of the execution paths of the software code.

In operation 1442, the SSE module 1220 identifies a number of iterations that a loop (e.g., among multiple loops) within the second portion of the execution paths is to be executed. This identification may be made based on the concrete execution of at least a portion of the CFG, as described above with respect to operation 1440. In example embodiments that include operation 1442, the identified number of iterations for the loop is a basis on which the SSE module 1220 generates the at least one formula that corresponds to all executable statements in the second portion of the execution paths. Thus, generation of the at least one formula may be based on the identified number of iterations that the loop is to be executed.

Figure 15:
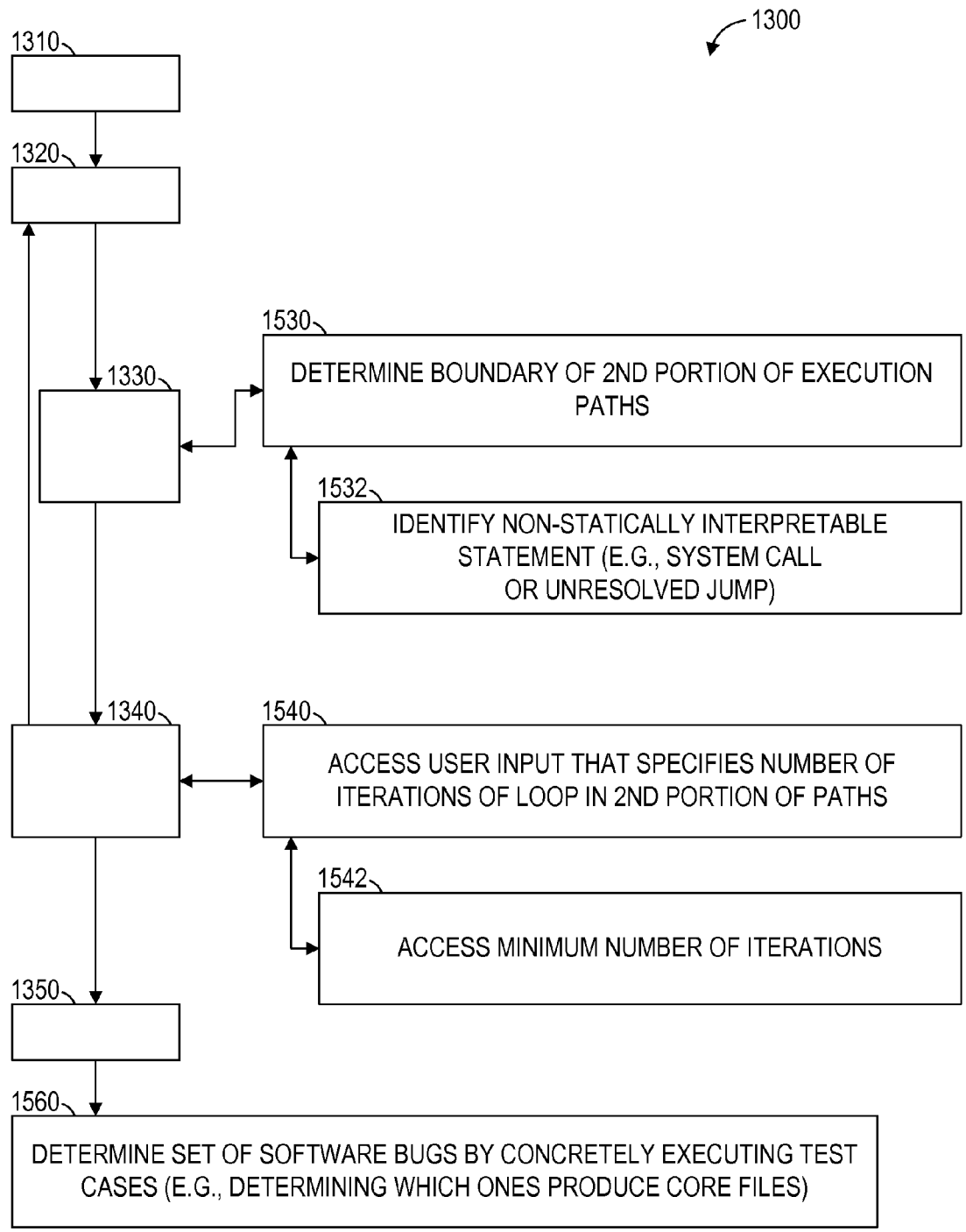

As shown in FIG. 15, the method 1300 may include one or more of operations 1530, 1540, and 1560. Operation 1530 may be performed as part (e.g., a precursor task, a subroutine, or a portion) of operation 1330, in which the SSE module 1220 determines that the second portion of the execution paths is devoid of non-statically interpretable executable statements. In operation 1530, the SSE module 1220 determines a boundary of the second portion of the execution paths (e.g., to distinguish the second portion from further portions of the execution paths within the software code being analyzed by the automatic test). This boundary determination may be performed by identifying within the software code a non-statically interpretable executable statement (e.g., a non-statically interpretable node) within the software code.

Operation 1532 may be performed as part of operation 1530. In operation 1532, the SSE module 1220 identifies the non-statically interpretable executable statement by identifying a system call, an unresolved jump, or any suitable combination thereof, within the software code. Accordingly, the boundary of the second portion of the execution paths may be determined in operation 1530 based on (e.g., in a manner so as to exclude) the system call or unresolved jump identified in operation 1532.

As shown in FIG. 15, operation 1540 may be performed as part of operation 1340, in which the SSE module 1220 performs an SSE phase of the automatic test on the software code. In operation 1540, the SSE module 1220 accesses a user input (e.g., submitted by a user, such as user 1132 via the device 1130) that specifies a number of iterations that a loop (e.g., among multiple loops) within the second portion of the execution paths is to be executed.

In some example embodiments, the user input specifies a minimum number of iterations for executing the loop. This situation is shown within FIG. 15 by operation 1542. In operation 1542, the minimum number of iterations may be accessed (e.g., as a user submission) via a graphical user interface (e.g., dialog box), user preference profile, the configuration file for the software testing machine 1110, or any suitable accommodation thereof. In alternative example embodiments, the user input specifies a maximum number of iterations for executing the loop. In such alternative example embodiments, an operation analogous to operation 1542 may be performed as part of operation 1540 to access the maximum number of iterations.

As shown in FIG. 15, operation 1560 may be performed after operation 1350, in which the solver module 1230 generates the set of test cases based on formulas generated during the dynamic and static phases (e.g., multiple dynamic phase and multiple static phases) of the automatic test. In operation 1560, the solver module 1230 determines a set of one or more software bugs in the software code. The determination may be performed by concretely executing one or more test cases from the generated set of test cases from operation 1350. Furthermore, operation 1560 may include determining which test cases among the generated set of test cases produce core files during concrete execution. Thus, by virtue of performing operations 1350 and 1560 in the method 1300, the software testing machine 1110 may be configured to output test cases and corresponding software bugs found during veritesting of the software code.

Figure 16:
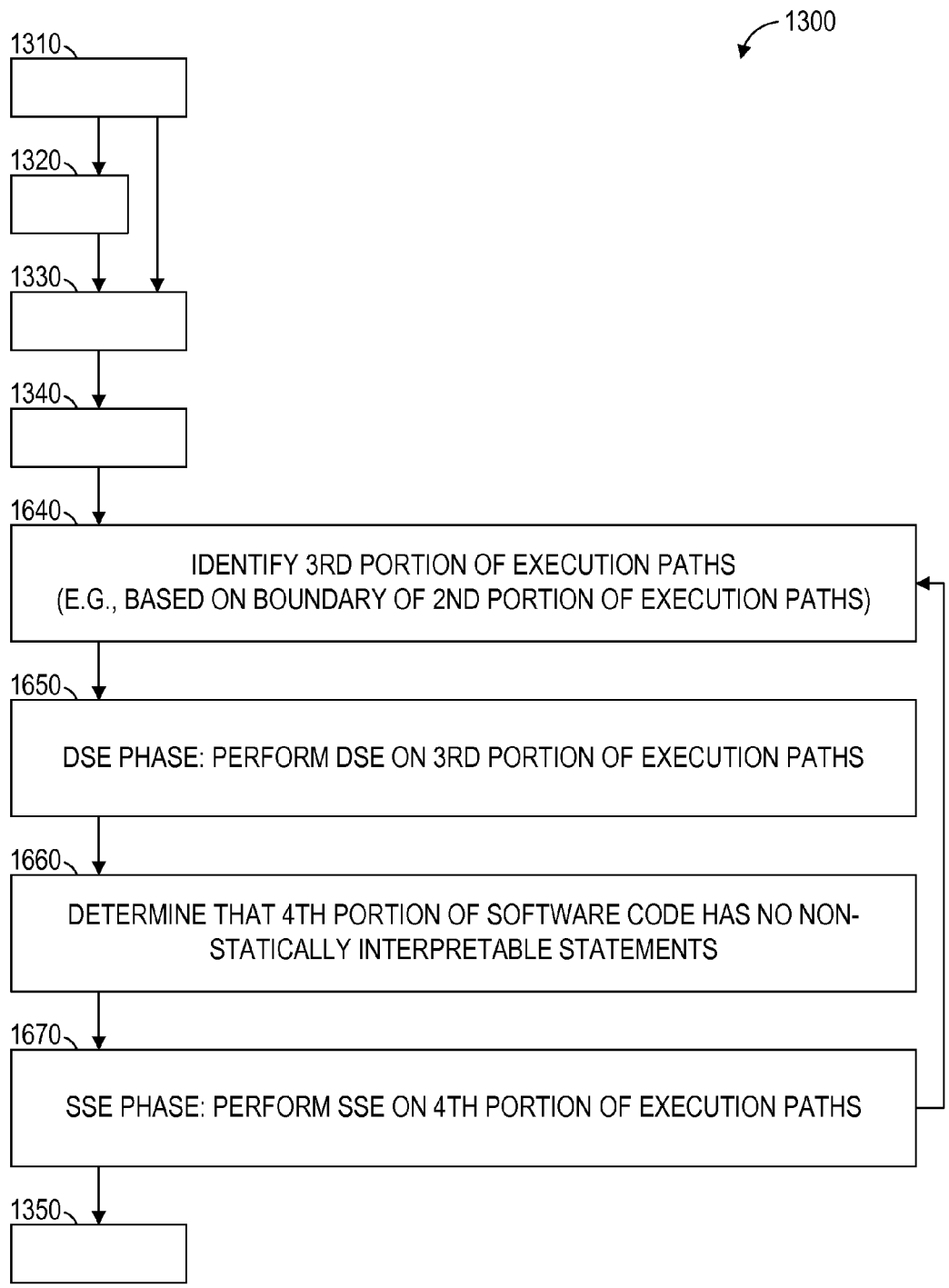

FIG. 16 illustrates another way to visualize the dynamic and opportunistic alternation (e.g., switching) between DSE and SSE on various portions of the execution paths in the software code. As shown in FIG. 16, the method 1300 may further include one or more of operations 1640, 1650, 1660, and 1670, as well as repetitions of any one or more of these operations. In addition, FIG. 16 illustrates example embodiments in which an SSE phase is performed first, instead of starting with a DSE phase, as described above with respect to FIG. 13.

In operation 1640, the DSE module 1210 identifies a third portion of the execution paths of the software code. This identification of the third portion may be based on the boundary of the second portion, as determined in operation 1530. In particular, the third portion may include the non-statically interpretable executable statement identified in operation 1532 (e.g., the system call or the unresolved jump). Thus, the boundary between the second and third portions of the execution paths may be determined such that the second portion is devoid of any non-statically interpretable executable statement, while the third portion includes at least one non-statically interpretable executable statement.

In operation 1650, the DSE module 1210 performs another (e.g., further) dynamic phase (e.g., DSE phase) of the automatic test of the software code accessed in operation 1310. Operation 1650 may be performed in a manner similar to that described above with respect to operation 1320, except operation 1650 is performed on the third portion of the execution paths, which was identified in operation 1640. As noted above, performance of DSE on the third portion of the execution paths results in the forking of a separate symbolic executor for each execution path in the third portion of the execution paths. As discussed above, each forked symbolic executor generates a corresponding formula for the corresponding execution path. In some example embodiments, the generation of one or more of these formulas is performed by the formula module 1250 (e.g., as requested or directed by the DSE module 1210). In example embodiments that include operation 1650, the generating of the test cases in operation 1350 also includes solving the formulas generated from operation 1650.

As shown in FIG. 16, after operation 1650, the software testing machine 1110 may switch back to SSE mode and perform operations 1660 and 1670. In operation 1660, the SSE module 1220 determines that a further portion (e.g., a fourth portion) of the execution paths is devoid of non-statically interpretable executable statements. This may be done in a manner similar to that described above with respect to operation 1330. As noted above, such non-statically interpretable executable statements may include system calls, unresolved jumps, other executable statements that are not statically interpretable, or any suitable combination thereof.

In operation 1670, the SSE module 1220 performs another (e.g., further) static phase (e.g., SSE phase) of the automatic test of the software code accessed in operation 1310. Specifically, the SSE module 1220 performs SSE on the portion (e.g., the fourth portion) of the execution paths determined in operation 1660 to be devoid of non-statically interpretable executable statements. This SSE phase of the automatic test may be initiated in response to performance of operation 1660 or the result thereof and may be performed in a manner similar to that described above with respect to operation 1340. As discussed above, SSE generates at least one formula that corresponds to all executable statements in the portion (e.g., the fourth portion) of the execution paths processed. Accordingly, all of the executable statements in the fourth portion of the execution paths may collectively correspond to the one or more formulas generated in operation 1670. In some example embodiments, the generation of one or more of these formulas is performed by the formula module 1250 (e.g., as requested or directed by the SSE module 1220). In FIG. 16, a loopback arrow is provided to indicate that the software testing machine 1110 may repeatedly execute operations 1640, 1650, 1660, and 1670, or similar operations, to dynamically and opportunistically alternate (e.g., switch) back and forth between DSE and SSE, as appropriate for various portions of the execution paths in the software code to be tested. In example embodiments that include operation 1670, the generating of the test cases in operation 1330 also includes solving the formulas generated from operation 1670.

According to various example embodiments, one or more of the methodologies described herein may facilitate automatic testing of software code. Moreover, one or more of the methodologies described herein may facilitate generation of test cases, discovery of software bugs, or any suitable combination thereof. As discussed above, one or more of the methodologies described herein may facilitate provision of a scalable, cloud-based, software testing service capable of testing thousands of programs with improved metrics compared to previous approaches.

When these effects are considered in aggregate, one or more of the methodologies described herein may obviate a need for certain efforts or resources that otherwise would be involved in automatic testing of software. Efforts expended by a user in generating test cases, finding software bugs, or both, may be reduced by use of (e.g., reliance upon) a machine that implements one or more of the methodologies described herein. Computing resources used by one or more machines or devices (e.g., within the network environment 1100) may similarly be reduced (e.g., compared to machines or devices that lack one or more of the methodologies described herein). Examples of such computing resources include processor cycles, network traffic, memory usage, data storage capacity, power consumption, and cooling capacity.

Figure 17:
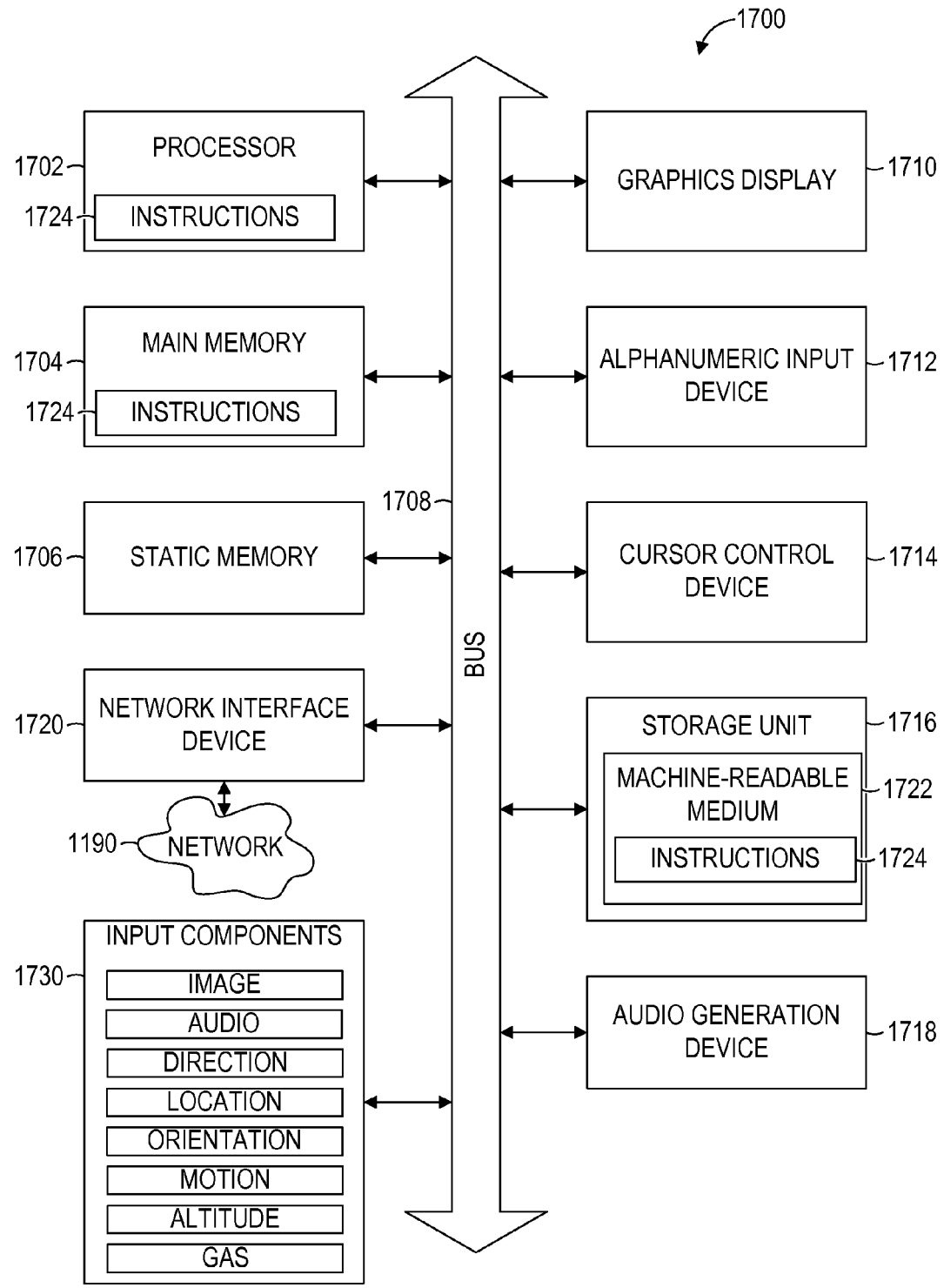
FIG. 17 is a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e.g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be communicatively coupled (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1724 to perform all or part of any one or more of the methodologies discussed herein.

The machine 1700 includes a processor 1702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1704, and a static memory 1706, which are configured to communicate with each other via a bus 1708. The processor 1702 may contain solid-state digital microcircuits (e.g., electronic, optical, or both) that are configurable, temporarily or permanently, by some or all of the instructions 1724 such that the processor 1702 is configurable to perform any one or more of the methodologies described herein, in whole or in part. For example, a set of one or more microcircuits of the processor 1702 may be configurable to execute one or more modules (e.g., software modules) described herein. In some example embodiments, the processor 1702 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1700 with at least the processor 1702, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a cursor control device 1714 (e.g., a mouse, a touchpad, a trackball, a joystick, a motion sensor, an eye tracking device, or other pointing instrument), a storage unit 1716, an audio generation device 1718 (e.g., a sound card, an amplifier, a speaker, a headphone jack, or any suitable combination thereof), and a network interface device 1720.

The storage unit 1716 includes the machine-readable medium 1722 (e.g., a tangible and non-transitory machine-readable storage medium) on which are stored the instructions 1724 embodying any one or more of the methodologies or functions described herein. The instructions 1724 may also reside, completely or at least partially, within the main memory 1704, within the processor 1702 (e.g., within the processor's cache memory), or both, before or during execution thereof by the machine 1700. Accordingly, the main memory 1704 and the processor 1702 may be considered machine-readable media (e.g., tangible and non-transitory machine-readable media). The instructions 1724 may be transmitted or received over the network 1190 via the network interface device 1720. For example, the network interface device 1720 may communicate the instructions 1724 using any one or more transfer protocols (e.g., hypertext transfer protocol (HTTP)).

In some example embodiments, the machine 1700 may be a portable computing device, such as a smart phone or tablet computer, and have one or more additional input components 1730 (e.g., sensors or gauges). Examples of such input components 1730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1730 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1724 for execution by the machine 1700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1724).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., one or more machines, devices, or other apparatus) discussed herein.

A first embodiment provides a method comprising:
by a dynamic symbolic execution engine comprising one or more processors:
accessing software code to be automatically tested, the software code including multiple execution paths through multiple executable statements of the software code; and
performing a dynamic phase of an automatic test of the software code by performing dynamic symbolic execution of a first portion of the execution paths, the dynamic symbolic execution forking a separate symbolic executor for each execution path in the first portion, each forked symbolic executor generating a corresponding formula for the corresponding execution path;
by a static symbolic execution engine comprising one or more processors:
determining that a second portion of the execution paths is devoid of non-statically interpretable executable statements; and
performing a static phase of the automatic test of the software code by performing static symbolic execution of the second portion of the execution paths in response to the determining that the second portion is devoid of non-statically interpretable executable statements, the static symbolic execution generating at least one formula that corresponds to all executable statements in the second portion of the execution paths; and
by a solver module comprising one or more processors, generating a set of test cases for the software code by solving the formulas generated during the dynamic and static phases of the automatic test of the software code.

A second embodiment provides a method according to the first embodiment, wherein:
the determining that the second portion of the execution paths is devoid of non-statically interpretable executable statements is in response to the dynamic symbolic execution of the first portion of the execution paths encountering a symbolic branch within the first portion of the execution paths.

A third embodiment provides a method according to the first embodiment of the second embodiment, wherein the determining that the second portion of the execution paths is devoid of non-statically interpretable executable statements includes:
generating a control flow graph that represents the second portion of the execution paths; and
determining that non-statically interpretable executable statements are absent from the generated control flow graph that represents the second portion of the execution paths.

A fourth embodiment provides a method according to the third embodiment, wherein:
the generated control flow graph is an intra-procedural partial control flow graph of the software code and represents only the second portion of the execution paths.

A fifth embodiment provides a method according to the third embodiment or fourth embodiment, wherein the static symbolic execution of the second portion of the execution paths includes:
concretely executing at least a portion of the control flow graph that represents the second portion of the execution paths; and
identifying a number of iterations that a loop within the second portion of the execution paths is to be executed; and wherein
the static symbolic execution generates the at least one formula for the executable statements in the second portion of the execution paths based on the number of iterations that the loop is to be executed.

A sixth embodiment provides a method according to any of the first through fifth embodiments, wherein the static symbolic execution of the second portion of the execution paths includes:
accessing a user input that specifies a number of iterations that a loop within the second portion of the execution paths is to be executed; and wherein
the static symbolic execution generates the formulas for the executable statements in the second portion of the execution paths based on the user input that specifies the number of iterations that the loop is to be executed.

A seventh embodiment provides a method according to the sixth embodiment, wherein:
the accessed user input is a minimum number of iterations that loops are to be executed.

An eighth embodiment provides a method according to any of the first through seventh embodiments, wherein the determining that the second portion of the execution paths is devoid of non-statically interpretable executable statements includes:
determining a boundary of the second portion of the execution paths by identifying within the software code a non-statically interpretable executable statement.

A ninth embodiment provides a method according to the eighth embodiment, wherein:
the identifying of the non-statically interpretable executable statement includes identifying at least one of a system call or an unresolved jump.

A tenth embodiment provides a method according to the eighth embodiment or the ninth embodiment, further comprising:
by the dynamic symbolic execution engine:
identifying a third portion of the execution paths based on the boundary of the second portion of the execution paths, the third portion including the identified non-statically interpretable executable statement; and
performing a further dynamic phase of the automatic test of the software code by performing dynamic symbolic execution of the third portion of the execution paths, the dynamic symbolic execution of the third portion forking a separate symbolic executor for each execution path in the third portion, each forked symbolic executor generating a corresponding formula for the corresponding execution path in the third portion.

An eleventh embodiment provides a method according to the tenth embodiment, wherein:
the generating of the set of test cases includes solving the formulas generated from the dynamic symbolic execution of the third portion of the execution paths, the third portion including the identified non-statically interpretable executable statement.

A twelfth embodiment provides a machine-readable medium (e.g., a non-transitory machine-readable storage medium) comprising instructions that, when executed by one or more processors of a machine, cause the machine to perform operations comprising:
by a dynamic symbolic execution engine comprising one or more processors:
accessing software code to be automatically tested, the software code including multiple execution paths through multiple executable statements of the software code; and
performing a dynamic phase of an automatic test of the software code by performing dynamic symbolic execution of a first portion of the execution paths, the dynamic symbolic execution forking a separate symbolic executor for each execution path in the first portion, each forked symbolic executor generating a corresponding formula for the corresponding execution path;
by a static symbolic execution engine comprising one or more processors:
determining that a second portion of the execution paths is devoid of non-statically interpretable executable statements; and
performing a static phase of the automatic test of the software code by performing static symbolic execution of the second portion of the execution paths in response to the determining that the second portion is devoid of non-statically interpretable executable statements, the static symbolic execution generating at least one formula that corresponds to all executable statements in the second portion of the execution paths; and
by a solver module comprising one or more processors, generating a set of test cases for the software code by solving the formulas generated during the dynamic and static phases of the automatic test of the software code.

A thirteenth embodiment provides a machine-readable medium according to the twelfth embodiment, wherein:
the determining that the second portion of the execution paths is devoid of non-statically interpretable executable statements is in response to the dynamic symbolic execution of the first portion of the execution path encountering a symbolic branch within the first portion of the execution paths.

A fourteenth embodiment provides a machine-readable medium according to the twelfth embodiment or the thirteenth embodiment, wherein:
the determining that the second portion of the execution paths is devoid of non-statically interpretable executable statements includes:
generating a control flow graph that represents the second portion of the execution paths; and
determining that non-statically interpretable executable statements are absent from the generated control flow graph that represents the second portion of the execution paths.

A fifteenth embodiment provides a machine-readable medium according to any of the twelfth through fourteenth embodiments, wherein:
the static symbolic execution of the second portion of the execution paths includes:
concretely executing at least a portion of the control flow graph that represents the second portion of the execution paths; and
identifying a number of iterations that a loop within the second portion of the execution paths is to be executed; and wherein
the static symbolic execution generates the formulas for the executable statements in the second portion of the execution paths based on the number of iterations that the loop is to be executed.

A sixteenth embodiment provides a machine-readable medium according to any of the twelfth through fifteenth embodiments, wherein:
the static symbolic execution of the second portion of the execution paths includes:
accessing a user input that specifies a number of iterations that a loop within the second portion of the execution paths is to be executed; and wherein
the static symbolic execution generates the formulas for the executable statements in the second portion of the execution paths based on the user input that specifies the number of iterations that the loop is to be executed.

A seventeenth embodiment provides a system comprising:
a dynamic symbolic execution engine comprising one or more processors and configured to:
access software code to be automatically tested, the software code including multiple execution paths through multiple executable statements of the software code; and
perform a dynamic phase of an automatic test of the software code by performing dynamic symbolic execution of a first portion of the execution paths, the dynamic symbolic execution forking a separate symbolic executor for each execution path in the first portion, each forked symbolic executor generating a corresponding formula for the corresponding execution path;
a static symbolic execution engine comprising one or more processors and configured to:
determine that a second portion of the execution paths is devoid of non-statically interpretable executable statements; and perform a static phase of the automatic test of the software code by performing static symbolic execution of the second portion of the execution paths in response to the determining that the second portion is devoid of non-statically interpretable executable statements, the static symbolic execution generating at least one formula that corresponds to all executable statements in the second portion of the execution paths; and a solver module comprising one or more processors and configured to generate a set of test cases for the software code by solving the formulas generated during the dynamic and static phases of the automatic test of the software code.

An eighteenth embodiment provides a system according to the seventeenth embodiment, wherein:
the static symbolic execution engine, in determining that the second portion of the execution paths is devoid of non-statically interpretable executable statements, is configured to determine a boundary of the second portion of the execution paths by identifying within the software code a non-statically interpretable executable statement.

A nineteenth embodiment provides a system according to the eighteenth embodiment, wherein the dynamic symbolic execution engine is further configured to:
identify a third portion of the execution paths based on the boundary of the second portion of the execution paths, the third portion including the identified non-statically interpretable executable statement; and
perform a further dynamic phase of the automatic test of the software code by performing dynamic symbolic execution of the third portion of the execution paths, the dynamic symbolic execution of the third portion forking a separate symbolic executor for each execution path in the third portion, each forked symbolic executor generating a corresponding formula for the corresponding execution path in the third portion.

A twentieth embodiment provides a system according to the nineteenth embodiment, wherein:
the solver module, in generating the set of test cases, is configured to solve the formulas generated from the dynamic symbolic execution of the third portion of the execution paths, the third portion including the identified non-statically interpretable executable statement.

A twenty-first embodiment provides a system according to any of the seventeenth through twentieth embodiments, wherein:
the solver module is further configured to determine a set of software bugs in the software code by concretely executing the generated set of test cases and determining which test cases among the generated set of test cases produce core files during concrete execution.

A twenty-second embodiment provides a carrier medium carrying machine-readable instructions for controlling a machine to carry out the method of any one of the previously described embodiments.

The following documents are incorporated herein by reference in their entirety:

[1] C. Cadar, V. Ganesh, P. M. Pawlowski, D. L. Dill, and D. R. Engler. *EXE: Automatically Generating Inputs of Death*. In ACM Conference on Computer and Communications Security, 2006. ISBN 1595935185.

[2] P. Godefroid, N. Klarlund, and K. Sen. *DART: Directed Automated Random Testing*. In Programming Language Design and Implementation, 2005. ISBN 1595930809.

[3] C. Cadar, D. Dunbar, and D. Engler. *KLEE: Unassisted and Automatic Generation of High-coverage Tests for Complex Systems Programs*. In Proceedings of the USENIX Symposium on Operating System Design and Implementation, pages 209-224, 2008a.

[4] E. Bounimova, P. Godefroid, and D. Molnar. *Billions and Billions of Constraints: Whitebox Fuzz Testing in Production*. Technical report, Microsoft MSR-TR-2012-55, 2012.

[5] S. K. Cha, T. Avgerinos, A. Rebert, and D. Brumley. *Unleashing Mayhem on Binary Code*. In Proceedings of the IEEE Symposium on Security and Privacy, pages 380-394, 2012. 10.1109/SP.2012.31.

[8] V. Kuznetsov, J. Kinder, S. Bucur, and G. Candea. *Efficient state merging in symbolic execution*. In Proceedings of the ACM Conference on Programming Language Design and Implementation, pages 193-204, 2012.

[9] K. Sen, D. Marinov, and G. Agha. *CUTE: A Concolic Unit Testing Engine for C*. In ACM SIGSOFT International Symposium on Foundations of Software Engineering, 2005. ISBN 1595930140.

[10] P. Godefroid, M. Y. Levin, and D. Molnar. *SAGE: Whitebox fuzzing for security*. Communications of the ACM, 55(3):40, March 2012.

[11] D. Babic and A. J. Hu. *Calysto: Scalable and Precise Extended Static Checking*. In Proceedings of the International Conference on Software Engineering, pages 211-220, 2008.

[12] Y. Xie and A. Aiken. *Scalable error detection using Boolean satisfiability*. In ACM Symposium on Principles of Programming Languages, volume 40, pages 351-363, January 2005. ISBN 158113830X. 10.1145/1047659.1040334. URL http://portal.acm.org/citation.cfm?doid=1047659.1040334.

[13] I. Dillig, T. Dillig, and A. Aiken. *Sound, Complete and Scalable Path-Sensitive Analysis*. In Programming Language Design and Implementation, pages 270-280. ACM, 2008. ISBN 9781595938602. 10.1145/1375581.1375615. URL http://portal.acm.org/citation.cfm?doid=1375581.1375615.

[14] A. Koelbl and C. Pixley. *Constructing Efficient Formal Models from High-Level Descriptions Using Symbolic Simulation*. International Journal of Parallel Programming, 33 (6):645-666, December 2005.

[15] D. Beyer, T. A. Henzinger, and G. Theoduloz. *Configurable Software Verification: Concretizing the Convergence of Model Checking and Program Analysis*. In International Conference on Computer Aided Verification, pages 504-518, 2007. 10.1007/978-3-540-73368-3_51.

[16] T. Hansen, P. Schachte, and H. Søndergaard. *State joining and splitting for the symbolic execution of binaries*. Runtime Verification, pages 76-92, 2009.

[17] P. Godefroid, M. Y. Levin, and D. Molnar. *Automated Whitebox Fuzz Testing*. In Network and Distributed System Security Symposium, July, 2008.

[18] J. Kinder and H. Veith. *Jakstab: A Static Analysis Platform for Binaries*. In Proceedings of the 20th International Conference on Computer Aided Verification, pages 423-427. Springer, 2008. 10.1007/978-3-540-70545-1_40.

[19] S. Bardin, P. Herrmann, J. Leroux, O. Ly, R. Tabary, and A. Vincent. *The BINCOA Framework for Binary Code Analysis*. In Computer Aided Verification, pages 165-170, 2011. 10.1007/978-3-642-22110-1_13.

[20] D. Brumley, I. Jager, T. Avgerinos, and E. J. Schwartz. *BAP: A Binary Analysis Platform*. In Proceedings of the 23rd International Conference on Computer Aided Verification, pages 463-469. Springer, 2011. 10.1007/978-3-642-22110-1_37. URL http://www.springerlink.com/index/M664N1722X433182.pdf.

[21] L. D. Moura and N. Bjørner. *Z3: An efficient SMT solver.* In Tools and Algorithms for the Construction and Analysis of Systems, 2008. URL http://link.springer.com/chapter/10.1007/978-3-540-78800-3_24.

[22] C.-K. Luk, R. Cohn, R. Muth, H. Patil, A. Klauser, G. Lowney, S. Wallace, V. J. Reddi, and K. Hazelwood. *Pin: Building Customized Program Analysis Tools with Dynamic Instrumentation.* In Programming Language Design and Implementation, pages 190-200. ACM, 2005. ISBN 1595930566. 10.1145/1065010.1065034. URL http://portal.acm.org/citation.cfm?doid=1065010.1065034.

[23] J. Filliâtre and S. Conchon. *Type-safe modular hash-consing.* In Proceedings of the Workshop on ML, pages 12-19, 2006.

[24] D. Babic. *Exploiting structure for scalable software verification.* PhD thesis, University of British Columbia, Vancouver, Canada, 2008.

[25] E. Goto. *Monocopy and Associative Algorithms in Extended Lisp.* 1974.

[26] S. Bucur, V. Ureche, C. Zamfir, and G. Candea. *Parallel symbolic execution for automated real-world software testing.* In Proceedings of the ACM SIGOPS European Conference on Computer Systems, pages 183-198. ACM Press, 2011.

[27] P. Dan Marinescu and C. Cadar. *make test-zesti: A symbolic execution solution for improving regression testing.* 2012 34th International Conference on Software Engineering (ICSE), pages 716-726, June 2012. 10.1109/ICSE.2012.6227146. URL http://ieeexplore.ieee.org/lpdocs/epic03/wrapper.htm?arnumber=6227146.

[28] V. Chipounov, V. Kuznetsov, and G. Candea. *S2E: A platform for in-vivo multi-path analysis of software systems.* In Proceedings of the International Conference on Architectural Support for Programming Languages and Operating Systems, pages 265-278, 2011.

[29] J. C. King. *Symbolic execution and program testing.* Communications of the ACM, 19(7):385-394, 1976. 10.1145/360248.360252.

[30] R. S. Boyer, B. Elspas, and K. N. Levitt. *SELECT—a formal system for testing and debugging programs by symbolic execution.* ACM SIGPLAN Notices, 10(6):234-245, 1975.

[31] W. Howden. *Methodology for the Generation of Program Test Data.* IEEE Transactions on Computers, C-24 (5): 554-560, 1975.

[32] C. S. Pasareanu and W. Visser. *A survey of new trends in symbolic execution for software testing and analysis.* International Journal on Software Tools for Technology Transfer, 11(4):339-353, August 2009. ISSN 1433-2779. 10.1007/s10009-009-0118-1. URL http://www.springerlink.com/index/10.1007/s10009-009-0118-1.

[33] E. J. Schwartz, T. Avgerinos, and D. Brumley. *All You Ever Wanted to Know about Dynamic Taint Analysis and Forward Symbolic Execution (but Might Have Been Afraid to Ask).* In Proceedings of the IEEE Symposium on Security and Privacy, pages 317-331. IEEE, 2010. ISBN 978-1-4244-6894-2. 10.1109/SP.2010.26. URL http://ieeexplore.ieee.org/lpdocs/epic03/wrapper.htm?arnumber=5504796.

[34] C. Cadar and K. Sen. *Symbolic execution for software testing: three decades later.* Communications of the ACM, 2013. URL http://dl.acm.org/citation.cfm?id=2408795.

[35] J. R. Allen, K. Kennedy, C. Porterfield, and J. Warren. *Conversion of Control Dependence to Data Dependence.* In ACM Symposium on Principles of Programming Languages, pages 177-189, New York, N.Y., USA, 1983. ACM Press.

[36] C. Lattner and V. Adve. *LLVM: A compilation framework for lifelong program analysis & transformation.* Proceedings of the Symposium on Code Generation and Optimization, pages 75-86, 2004.

[37] P. Collingbourne, C. Cadar, and P. H. Kelly. *Symbolic crosschecking of floating-point and SIMD code.* Proceedings of the ACM SIGOPS European Conference on Computer Systems, page 315, 2011.

[38] P. Boonstoppel, C. Cadar, and D. Engler. *RWset: Attacking Path Explosion in Constraint-Based Test Generation.* In Proceedings of the International Conference on Tools and Algorithms for the Construction and Analysis of Systems, pages 351-366, 2008.

[39] P. Godefroid. *Compositional Dynamic Test Generation.* In Proceedings of the ACM SIGPLAN-SIGACT Symposium on Principles of Programming Languages, pages 47-54, 2007.

[40] S. Anand, P. Godefroid, and N. Tillmann. *Demand-Driven Compositional Symbolic Execution.* In Tools and Algorithms for the Construction and Analysis of Systems, 2008.

[42] P. Tu and D. Padua. *Efficient building and placing of gating functions.* In Proceedings of the ACM SIGPLAN 1995 Conference on Programming Language Design and Implementation, volume 30 of PLDI '95, pages 47-55. ACM, 1995.

[44] A. V. Aho, R. Sethi, and J. D. Ullman. *Compilers: principles, techniques, and tools.* Addison-Wesley Longman Publishing Co., Inc., Boston, Mass., USA, 1986. ISBN 0-201-10088-6.

[45] C. Flanagan and J. Saxe. *Avoiding exponential explosion: Generating compact verification conditions.* In Proceedings of the ACM SIGPLAN-SIGACT Symposium on Principles of Programming Languages, pages 193-205, 2001.

[46] C. Cadar, D. Dunbar, and D. R. Engler. *KLEE Coreutils Experiment.* http://klee.llvm.org/CoreutilsExperiments.html, 2008b.

[47] K. R. M. Leino. *Efficient weakest preconditions.* Information Processing Letters, 93(6): 281-288, 2005.

What is claimed is:

1. A method comprising:
   by a dynamic symbolic execution engine comprising one or more processors:
   accessing software code to be automatically tested, the software code including multiple execution paths through multiple executable statements of the software code; and
   performing a dynamic phase of an automatic test of the software code by performing dynamic symbolic execution of a first portion of the execution paths, the dynamic symbolic execution of the first portion omitting a second portion of the execution paths and forking a separate symbolic executor for each execution path in the first portion, each forked symbolic executor generating a corresponding formula for the corresponding execution path;
   by a static symbolic execution engine comprising one or more processors:
   determining that the second portion of the execution paths is devoid of non-statically interpretable executable statements; and
   performing a static phase of the automatic test of the software code by performing static symbolic execution of the second portion of the execution paths in response to the determining that the second portion is devoid of non-statically interpretable executable statements, the static symbolic execution of the second portion omitting the first portion of the execution paths and generating at least one formula that corresponds to all executable statements in the second portion of the execution paths and corresponds to no executable statements in the first portion of the execution paths; and by a solver module comprising one or more processors, generating a set of test cases for the software code by solving the formulas generated during the dynamic and static phases of the automatic test of the software code.

2. The method of claim 1, wherein:
the determining that the second portion of the execution paths is devoid of non-statically interpretable executable statements is in response to the dynamic symbolic execution of the first portion of the execution paths encountering a symbolic branch within the first portion of the execution paths.

3. The method of claim 1, wherein the determining that the second portion of the execution paths is devoid of non-statically interpretable executable statements includes:
generating a control flow graph that represents the second portion of the execution paths; and
determining that non-statically interpretable executable statements are absent from the generated control flow graph that represents the second portion of the execution paths.

4. The method of claim 3, wherein:
the generated control flow graph is an intra-procedural partial control flow graph of the software code and represents only the second portion of the execution paths.

5. The method of claim 3, wherein the static symbolic execution of the second portion of the execution paths includes:
concretely executing at least a portion of the control flow graph that represents the second portion of the execution paths; and
identifying a number of iterations that a loop within the second portion of the execution paths is to be executed; and wherein
the static symbolic execution generates the at least one formula for the executable statements in the second portion of the execution paths based on the number of iterations that the loop is to be executed.

6. The method of claim 1, wherein the static symbolic execution of the second portion of the execution paths includes:
accessing a user input that specifies a number of iterations that a loop within the second portion of the execution paths is to be executed; and wherein
the static symbolic execution generates the formulas for the executable statements in the second portion of the execution paths based on the user input that specifies the number of iterations that the loop is to be executed.

7. The method of claim 6, wherein:
the accessed user input is a minimum number of iterations that loops are to be executed.

8. The method of claim 1, wherein the determining that the second portion of the execution paths is devoid of non-statically interpretable executable statements includes:
determining a boundary of the second portion of the execution paths by identifying within the software code a non-statically interpretable executable statement.

9. The method of claim 8, wherein:
the identifying of the non-statically interpretable executable statement includes identifying at least one of a system call or an unresolved jump.

10. The method of claim 8, further comprising:
by the dynamic symbolic execution engine:
identifying a third portion of the execution paths based on the boundary of the second portion of the execution paths, the third portion including the identified non-statically interpretable executable statement; and
performing a further dynamic phase of the automatic test of the software code by performing dynamic symbolic execution of the third portion of the execution paths, the dynamic symbolic execution of the third portion forking a separate symbolic executor for each execution path in the third portion, each forked symbolic executor generating a corresponding formula for the corresponding execution path in the third portion.

11. The method of claim 10, wherein:
the generating of the set of test cases includes solving the formulas generated from the dynamic symbolic execution of the third portion of the execution paths, the third portion including the identified non-statically interpretable executable statement.

12. A non-transitory machine-readable storage medium comprising instructions that, when executed by one or more processors of a machine, cause the machine to perform operations comprising:
by a dynamic symbolic execution engine comprising one or more processors:
accessing software code to be automatically tested, the software code including multiple execution paths through multiple executable statements of the software code; and
performing a dynamic phase of an automatic test of the software code by performing dynamic symbolic execution of a first portion of the execution paths, the dynamic symbolic execution of the first portion omitting a second portion of the execution paths and forking a separate symbolic executor for each execution path in the first portion, each forked symbolic executor generating a corresponding formula for the corresponding execution path;
by a static symbolic execution engine comprising one or more processors:
determining that the second portion of the execution paths is devoid of non-statically interpretable executable statements; and
performing a static phase of the automatic test of the software code by performing static symbolic execution of the second portion of the execution paths in response to the determining that the second portion is devoid of non-statically interpretable executable statements, the static symbolic execution of the second portion omitting the first portion of the execution paths and generating at least one formula that corresponds to all executable statements in the second portion of the execution paths and corresponds to no executable statements in the first portion of the execution paths; and
by a solver module comprising one or more processors, generating a set of test cases for the software code by solving the formulas generated during the dynamic and static phases of the automatic test of the software code.

13. The non-transitory machine-readable storage medium of claim 12; wherein:
the determining that the second portion of the execution paths is devoid of non-statically interpretable executable statements is in response to the dynamic symbolic execution of the first portion of the execution path encountering a symbolic branch within the first portion of the execution paths.

14. The non-transitory machine-readable storage medium of claim 12, wherein:
the determining that the second portion of the execution paths is devoid of non-statically interpretable executable statements includes:
generating a control flow graph that represents the second portion of the execution paths; and
determining that non-statically interpretable executable statements are absent from the generated control flow graph that represents the second portion of the execution paths.

15. The non-transitory machine-readable storage medium of claim 12, wherein:
the static symbolic execution of the second portion of the execution paths includes:
concretely executing at least a portion of the control flow graph that represents the second portion of the execution paths; and
identifying a number of iterations that a loop within the second portion of the execution paths is to be executed; and wherein
the static symbolic execution generates the formulas for the executable statements in the second portion of the execution paths based on the number of iterations that the loop is to be executed.

16. The non-transitory machine-readable storage medium of claim 12, wherein:
the static symbolic execution of the second portion of the execution paths includes:
accessing a user input that specifies a number of iterations that a loop within the second portion of the execution paths is to be executed; and wherein
the static symbolic execution generates the formulas for the executable statements in the second portion of the execution paths based on the user input that specifies the number of iterations that the loop is to be executed.

17. A system comprising:
a dynamic symbolic execution engine comprising one or more hardware processors and configured to:
access software code to be automatically tested, the software code including multiple execution paths through multiple executable statements of the software code; and
perform a dynamic phase of an automatic test of the software code by performing dynamic symbolic execution of a first portion of the execution paths, the dynamic symbolic execution of the first portion omitting a second portion of the execution paths and forking a separate symbolic executor for each execution path in the first portion, each forked symbolic executor generating a corresponding formula for the corresponding execution path;
a static symbolic execution engine comprising one or more hardware processors and configured to:
determine that the second portion of the execution paths is devoid of non-statically interpretable executable statements; and
perform a static phase of the automatic test of the software code by performing static symbolic execution of the second portion of the execution paths in response to the determining that the second portion is devoid of non-statically interpretable executable statements, the static symbolic execution of the second portion omitting the first portion of the execution paths and generating at least one formula that corresponds to all executable statements in the second portion of the execution paths and corresponds to no executable statements in the first portion of the execution paths; and
a solver module comprising one or more hardware processors and configured to generate a set of test cases for the software code by solving the formulas generated during the dynamic and static phases of the automatic test of the software code.

18. The system of claim 17, wherein:
the static symbolic execution engine, in determining that the second portion of the execution paths is devoid of non-statically interpretable executable statements, is configured to determine a boundary of the second portion of the execution paths by identifying within the software code a non-statically interpretable executable statement.

19. The system of claim 18, wherein the dynamic symbolic execution engine is further configured to:
identify a third portion of the execution paths based on the boundary of the second portion of the execution paths, the third portion including the identified non-statically interpretable executable statement; and
perform a further dynamic phase of the automatic test of the software code by performing dynamic symbolic execution of the third portion of the execution paths, the dynamic symbolic execution of the third portion forking a separate symbolic executor for each execution path in the third portion, each forked symbolic executor generating a corresponding formula for the corresponding execution path in the third portion.

20. The system of claim 19, wherein:
the solver module, in generating the set of test cases, is configured to solve the formulas generated from the dynamic symbolic execution of the third portion of the execution paths, the third portion including the identified non-statically interpretable executable statement.

21. The system of claim 17, wherein:
the solver module is further configured to determine a set of software bugs in the software code by concretely executing the generated set of test cases and determining which test cases among the generated set of test cases produce core files during concrete execution.

* * * * *

UNITED STATES PATENT AND TRADEMARK OFFICE
CERTIFICATE OF CORRECTION

PATENT NO.         : 9,619,375 B2
APPLICATION NO.    : 14/718329
DATED              : April 11, 2017
INVENTOR(S)        : Avgerinos et al.

It is certified that error appears in the above-identified patent and that said Letters Patent is hereby corrected as shown below:

On the Title Page

On page 2, in Column 1, under "Other Publications", Line 18, delete "la.," and insert --al.,-- therefor On page 2, in Column 2, under "Other Publications", Line 4, delete "Diustributions:" and insert --Distributions:-- therefor On page 2, in Column 2, under "Other Publications", Line 32, delete "Verication"," and insert --Verification",-- therefor In the Specification In Column 11, Line 53, delete "$\Delta[u]=ite(M(\Gamma_1 [\Lambda \rightarrow true],$" and insert --$\Delta[u]=ite(M(\Gamma_1[\Lambda \rightarrow true],$-- therefor In Column 15, Line 48, delete "5,]" and insert --5]-- therefor In the Claims In Column 39, Line 2, in Claim 13, delete "claim 12;" and insert --claim 12,-- therefor Signed and Sealed this
Tenth Day of July, 2018

Andrei Iancu
*Director of the United States Patent and Trademark Office*